(12) United States Patent
Lucas

(10) Patent No.: US 8,019,662 B2
(45) Date of Patent: *Sep. 13, 2011

(54) LIVESTOCK INVENTORY TRACKING SYSTEM AND METHODS

(76) Inventor: Michael T. Lucas, Calabasas, CA (US)

( * ) Notice: Subject to any disclaimer, the term of this patent is extended or adjusted under 35 U.S.C. 154(b) by 887 days.

This patent is subject to a terminal disclaimer.

(21) Appl. No.: 11/208,004

(22) Filed: Aug. 22, 2005

(65) Prior Publication Data

US 2006/0038010 A1 Feb. 23, 2006

Related U.S. Application Data

(63) Continuation-in-part of application No. 09/799,879, filed on Mar. 7, 2001, now Pat. No. 6,996,538.

(60) Provisional application No. 60/187,389, filed on Mar. 7, 2000.

(51) Int. Cl.
*G06Q 10/00* (2006.01)
*G06Q 20/00* (2006.01)
*G06G 1/14* (2006.01)

(52) U.S. Cl. ............................................. 705/28; 705/22
(58) Field of Classification Search .................. 705/1, 28, 705/22
See application file for complete search history.

(56) References Cited

U.S. PATENT DOCUMENTS

| | | | | |
|---|---|---|---|---|
| 5,315,505 A | * | 5/1994 | Pratt et al. ...................... | 600/300 |
| 5,712,989 A | * | 1/1998 | Johnson et al. .................. | 705/28 |
| 6,434,628 B1 | * | 8/2002 | Bowman-Amuah ............ | 714/48 |
| 6,664,897 B2 | * | 12/2003 | Pape et al. .................. | 340/573.3 |

* cited by examiner

*Primary Examiner* — Bradley B Bayat
*Assistant Examiner* — H Rojas

(57) ABSTRACT

The inventive subject matter relates to the field of electronic inventory control and tracking. In particular, the present invention relates to controlling and tracking livestock inventory items throughout the supply chain, from the birth of an animal to the sale of an animal product to the consumer. The inventive subject matter permits the development of animal product brands and/or marks, and provides a higher degree of source knowledge and producer accountability than has previously been available.

78 Claims, 14 Drawing Sheets

LIVESTOCK INVENTORY TRACKING SYSTEM AND METHODS

This application is a continuation-in-part of U.S. patent application Ser. No. 09/799,879, filed Mar. 7, 2001, now U.S. Pat. No. 6,996,538 the contents of which is hereby incorporated by reference in its entirety. Further, this application claims the benefit of U.S. Provisional Patent Application No. 60/187,389, filed Mar. 7, 2000, the contents of which is hereby incorporated by reference in its entirety.

BACKGROUND OF THE INVENTIVE SUBJECT MATTER

1. Field of the Inventive Subject Matter

The inventive subject matter relates to the field of electronic inventory control and tracking. In particular, the present invention relates to controlling and tracking livestock inventory items throughout the supply chain, from the birth of an animal to the sale of an animal product to the consumer. The inventive subject matter permits the development of animal product brands and/or marks, and provides a higher degree of source knowledge and producer accountability than has previously been available.

2. Background

Many enterprises have a great need for controlling and tracking an inventory item which is a tangible or intangible stock or object of the enterprise. Exemplary enterprises include, but are not limited to, retailers, developers, manufacturers, suppliers, distributors, service providers, carriers, government agencies and entities, and other organizations. An exemplary inventory item includes, but is not limited to, a raw material or component, a work in process, a product, a commodity, a good, or another item.

Traditionally, inventory control has been done by the company or organization using the items in the inventory. In smaller businesses, inventory control and tracking is typically not a high priority, and orders may be placed whenever items are out of stock.

As a business increases in size, inventory management becomes more of a challenge, and monitoring and tracking of frequently used or crucial items becomes very important. Typically a person is given the responsibility of monitoring and tracking inventory, and ordering replacements as supply diminishes. As a company further increases in size, more advanced inventory management and tracking techniques may be used. For example, supply and usage trends may be analyzed to determine minimum quantities on hand, and seasonal or other peak usage may be determined.

Some larger businesses have switched to automated or semi-automated inventory tracking systems. These automated systems may utilize barcode scanners or other electronic identifiers to track outgoing and incoming inventory, and can prepare purchase requests as supplies diminish.

In relation to food, and particularly livestock, the search, for example, for the birthplace of the cows whose meat went into a particular pound of hamburger or for the farms that grew the wheat used in a box of cereal may on first glance seem superfluous. But U.S. ranchers, farmers, food manufacturers, developers, and their distributors have three primary incentives to keep records tracking food production and distribution: improving supply-side management; differentiating and marketing foods with subtle or undetectable quality attributes; and facilitating traceback for food safety and quality. Such records provide information on the flow of food and food products throughout the U.S. food supply system and aid in tracking food to its source.

These three objectives have generated a widespread need for efficient and effective traceability systems. Yet the prior art has not provided a solution which encompasses the necessary depth and range of inventory control. For example, a traceability system for food safety, the depth of the traceability system depends on where hazards and remedies can enter the food production chain. For some health hazards, such as Bovine Spongiform Encephalopathy, ensuring food safety requires establishing safety measures at the farm. For other health hazards, such as bacterial pathogens, firms need to establish critical control points along the entire production and distribution chain.

Similarly, a traceability system for coffee would extend back to the processing stage; for fair-trade coffee would extend to information on price and terms of trade between coffee growers and processors; for fair wage would extend to harvest; for shade-grown, to cultivation; and for non-genetically engineered, to the bean or seed.

Traceability systems are a tool to help firms manage the flow of inputs and products to improve efficiency, differentiate products, maintain food safety, and maintain product quality. However, to be most effective, a traceability system must be paired with an inventory-control system, such as a real-time delivery system.

A common characteristic, and limitation, of the prior art inventory management and tracking techniques and systems is that they are not focused on inventory management and tracking techniques and systems that relate to a broad scope coverage in an inventory chain or supply channel. Conversely, the inventive subject matter provides accurate and current inventory auditing, accurate demand-driven forecasting based on accurate and current inventory audit information, and end-to-end inventory tracking in a chain of possession or a supply channel.

In meeting this need in the livestock industry, the inventive systems, the inventive methods, and the inventive computer software products track individual livestock inventory items at given time(s), using periodic survey(s), and/or scan-in/scan-out accounting, throughout a chain of possession or a supply channel. Thus, the inventive subject matter provides accurate and current inventory auditing, provides more accurate demand-driven forecasting based on accurate and current inventory audit information, and provides end-to-end inventory tracking in a chain of possession or a supply channel.

SUMMARY OF THE INVENTIVE SUBJECT MATTER

Currently, a "hands on" approach is taken for a physical inventory, which is labor intensive and generally completed either semi-annually or on an annual basis. The inventive subject matter provides accurate and current inventory auditing. For example, the inventive subject matter allows a customer, a manufacturer, a supplier, a distributor, or other enterprise in a supply to obtain continuous inventory item accounting at a pre-determined time interval or essentially instantaneously. This not only reduces the labor cost of an inventory audit, but also provides other useful information such as inventory status by the day, shift, or hour, which can then be compared to data from a Point of Sale to provide reporting as to "shrinkage" (i.e. product theft and other losses) for an area, a store, or a department within a store.

Further, the inventive subject matter provides accurate and current inventory information, upon which true demand-driven forecasting can be completed from customer-level data, for example. In such an example, as inventory items are removed from inventory at the retail level, others in the supply chain having permission from the retailer, such as developers, manufacturers, distributors, and suppliers, have access to the same information as the retailer. Because the data is provided essentially in real time and there need be no delay as found in conventional inventory management, the data is effectively linked to current events, alerting vendors of unexpectedly high, or low, consumption rates and permitting immediate forecast creation or alteration, as well as current and accurate inventory tracking.

Of course, the inventive subject matter is not limited to forecasting based on retail-level information. Indeed, it is expected that even greater demand-driven accuracy can be derived from forecasts based on inventory information from, for example, all levels of a supply chain.

In addition, the inventive subject matter provides end-to-end inventory tracking in a chain of or a supply channel. Thus, in fields requiring the establishment of a chain of custody, such as handling medical specimens or evidence, individual items may be accurately tracked throughout a series of transfers and storage locations.

Similarly, the inventive subject matter provides the ability to trace the origin, course, and even conditions of transport and handling of a particular item. Thus, in fields requiring establishment of a chain of possession, establishment of the conditions of handling at each stop in a supply channel, or both, such as the handling of perishable goods, the handling of goods where a showing of purity is important, or when seeking evidence of a lack of purity is important, individual items may be accurately tracked throughout a series of transfers and storage locations.

It will be readily apparent to one of ordinary skill in the art that the uses for accurate and current inventory audit, forecasting, and chain of custody information are many and varied. While various alternative embodiments of the present invention are disclosed and described in detail herein, it will be apparent to those skilled in the art that various changes in form and detail may be made therein without departing from the spirit and scope thereof, including applying the present invention to fields as diverse as food and beverages, healthcare, automobile parts, and consumer products. For example, Applicant provides the following non-limiting examples of the types of inventory items which can be controlled and tracked utilizing the inventive subject matter: agricultural products, livestock, timber and lumber food products, beverages, pharmaceuticals, medical and laboratory samples, financial instruments, vehicles, vehicle parts, machinery, consumer packaged goods, household products, office products, leisure and sporting goods, electronics and appliances, books, music recordings, video recordings, health and beauty aids, accommodations, oil, gas, water, electricity, and ingredients or components thereof.

Thus, the inventive subject matter relates to a livestock inventory management system, comprising the following elements, operably connected:

(a) at least one computer having at least one storage medium;

(b) one or more databases residing on said at least one storage medium;

(c) data collection software providing an interface to said one or more database(s);

(d) one or more unique readable identifiers accompanying a livestock animal;

(e) one or more data collection locations in communication with said at least one computer, each having:

(i) a reader appropriate to at least one unique identifier accompanying a livestock animal and capable of reading said at least one unique identifier, and (ii) a data measurement device; and (f) a timing device, wherein said software executes the following actions:

(i) storing in said one or more databases at least one data item measured by a data measurement device and associated with the unique readable identifier for a livestock animal, captured at a first time, (ii) storing in said one or more databases at least one data item measured by a data measurement device and associated with the unique readable identifier for said livestock animal, captured at a second time, (iii) generating and outputting a report of said at least two data items, (iv) tracking a livestock inventory item and updating at least one database for (1) said customer and (2) a livestock merchant, as livestock inventory items are added to, restocked to, or removed from inventory, (v) evaluating customer inventory information and inventory or cost information for a plurality of livestock merchants of said livestock animal in light of restocking parameters provided by said customer, and (vi) automatically ordering livestock merchant inventory which best fulfills said inventory restocking parameters provided by said customer.

Further, the inventive subject matter relates to a computer implemented method for livestock inventory management, comprising the steps of:

(a) at one or more data collection locations having a reader appropriate to at least one unique identifier accompanying a livestock animal and a data measurement device, measuring, collecting, and storing, in one or more databases on one or more storage media, maintained on one or more computers, at least the following data:

(i) at least one data item measured by a data measurement device and associated with a unique readable identifier for a livestock animal, captured at a first time, and (ii) at least one data item measured by a data measurement device and associated with a unique readable identifier for said livestock animal, captured at a second time;

(b) generating and outputting a report of said at least two data items;

(c) tracking a livestock inventory item and updating at least one database for (1) said customer and (2) a livestock merchant, as livestock inventory items are added to, restocked to, or removed from inventory;

(d) evaluating customer inventory information and inventory or cost information for a plurality of livestock merchants of said livestock animal in light of restocking parameters provided by said customer;

(e) automatically ordering livestock merchant inventory which best fulfills said inventory restocking parameters provided by said customer; and (f) providing access via software to information in said one or more databases to each said customer and livestock merchant, wherein said software allows one or more customers and livestock merchants to be classified into groups, and where permissions or roles are assigned to such groups.

In addition, the inventive subject matter relates to a computer program product for managing customer inventory, comprising program instructions stored on at least one computer readable storage medium which when executed cause a computer to:

(a) collect and store, on one or more databases, at least the following data:

(i) at least one data item measured by a data measurement device and associated with a unique readable identifier for a livestock animal, captured at a first time, and (ii) at least one data item measured by a data measurement device and associated with a unique readable identifier for said livestock animal, captured at a second time;

(b) generate and output a report of said at least two data items;

(c) evaluate said customer inventory information and inventory or cost information for a plurality of livestock merchants in light of said restocking parameters provided by said customer;

(d) order livestock merchant inventory which best fulfills said inventory restocking parameters provided by each said customer;

(e) track inventory items for (1) each customer and (2) each livestock merchant, as inventory items are added to, restocked to, or removed from inventory, (f) update said data on said one or more databases; and (g) provide access to the information in said one or more databases to said customer and livestock merchant, wherein said computer program product allows customers and livestock merchants to be classified into groups, and where permissions or roles are assigned to such groups.

DETAILED DESCRIPTION OF THE INVENTIVE SUBJECT MATTER

Definitions

Figure 1:
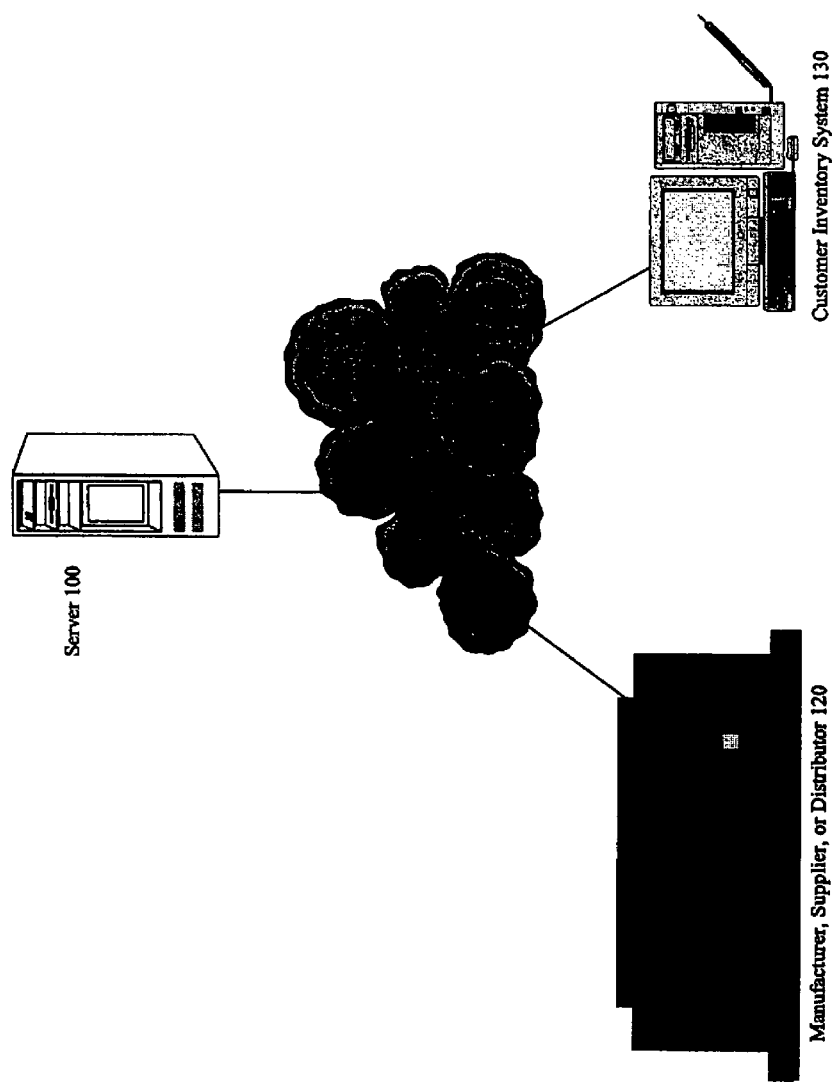
FIG. 1 is a block diagram illustrating the major hardware components of the present invention.

The term "inventory" as used herein refers broadly to the raw and other materials, work in process, goods, and other items which are the stock or object of an enterprise, as determined at a given time by a periodic survey. The related term "object" as used herein refers to something tangible or intangible, toward which action or thought is directed.

The term "livestock" as used herein refers to any animal kept or raised for home use or for profit, for example for milk, eggs, meat, or leather production, such as cattle, swine, chickens, horses, turkeys, sheep, goats, fish, and the like. The related term "animal" as used herein refers generally to a multicellular organism of the kingdom Animalia, having the capacity for locomotion, metabolism, pronounced response to stimuli, restricted growth, and fixed bodily structure.

The term "livestock inventory item" as used herein refers to any part of a livestock animal, such as a part of a carcass, or a whole animal, which is tagged as a separate inventory item. The term "livestock inventory item" as used herein does not include any part of a livestock animal which becomes an ingredient in another product, such as a processed food product.

The term "livestock producer" as used herein refers to a person or entity in the business of breeding and growing a livestock animal, encompassing for example a breeder and a rancher. This term is considered to be equivalent to the term "manufacturer" in the more general field of inventory management.

The term "feed lot" as used herein refers to a person or entity in the business of growing a livestock animal and preparing it for auction, encompassing for example an auction barn representative and a stockyard operator. This term is considered to be equivalent to the term "supplier" in the more general field of inventory management.

The term "processing plant" as used herein refers to a person or entity in the business of slaughtering a livestock animal and processing meat and other animal constituents for the processed food and consumer markets, encompassing for example a slaughterhouse, wholesale butcher, retail butcher, dairy, tannery, and shearer. This term is considered to be equivalent to the term "distributor" in the more general field of inventory management.

The term "livestock merchant" as used herein broadly refers to a person or entity in the chain of commerce of livestock, from breeding of a livestock animal to retail sale of a livestock product, and includes, but is not limited to, a breeder, rancher, auction barn representative, stockyard operator, tannery, shearer, dairy, slaughterhouse, butcher, retail vendor, and the like, and includes livestock producers, feed lots, and processing plants as defined above.

DETAILED DESCRIPTION OF PREFERRED EMBODIMENTS

In relation to food, and particularly livestock, the search for the birthplace of the cows whose meat went into a particular pound of hamburger or for the farms that grew the wheat used in a box of cereal may on first glance seem superfluous. But U.S. ranchers, farmers, food manufacturers, and their distributors have a number of incentives to keep records tracking food production and distribution. These records provide information on the flow of food and food products throughout the U.S. food supply system and aid in tracking food to its source.

Food suppliers have three primary incentives for establishing traceability:

1. improve supply-side management;
2. differentiate and market foods with subtle or undetectable quality attributes; and
3. facilitate traceback for food safety and quality.

Supply-side Management. A firm's traceability system is key to finding the most efficient ways to produce, assemble, warehouse, and distribute products. During the year 2000, American companies spent $1.6 trillion on supply-related activities, including the movement, storage, and control of products across the supply chain. Firms have an incentive to find ways to reduce these costs. In the food industry, where margins are thin, supply-side management, including traceability, is an increasingly important area of competition.

Electronic coding systems, such as bar code and radio-frequency identification systems, will help to streamline the U.S. food supply system. As technological innovation drives down the cost of traceability systems, more and more firms across the food supply chain are recognizing the need for electronic tracking systems.

Differentiating and Marketing Foods with Desirable Attributes. The U.S. food industry is a powerhouse producer of homogenous bulk commodities such as wheat, corn, and soybeans. Increasingly, the industry has also begun producing goods and services tailored to the tastes and preferences of various segments of the consumer population. The U.S. food system puts about 300,000 food products on store shelves around the country, with approximately 10,000 new product introductions each year. This long list of foods comprises an even longer list of attributes. Consumers easily detect some new product attributes, while other attribute innovations involve characteristics that consumers cannot discern even after consuming the product. Consumers cannot, for example, taste or otherwise distinguish between oil made from genetically engineered corn and conventional corn oil. These attributes can be content attributes or process attributes.

Content attributes affect the physical properties of a product, although they can be difficult for consumers to perceive. For example, consumers are unable to determine the amount of isoflavones in a glass of soymilk or the amount of calcium in a glass of enriched orange juice by drinking these beverages.

Process attributes do not affect final product content but refer to characteristics of the production process. Process attributes include country-of-origin, organic, free-range, dolphin-safe, shade-grown, earth-friendly, and fair trade. In general, neither consumers nor specialized testing equipment can detect process attributes.

Traceability is an indispensable part of any market for process attributes, and content attributes that are difficult or costly to measure. The only way to verify the existence of these attributes is through a record that establishes their creation and preservation. For example, tuna caught with dolphin-safe nets can be distinguished from tuna caught using other methods only through the recordkeeping system that ties the dolphin-safe tuna to the observer on the boat from which the tuna was caught. Without traceability as evidence of value, no viable market could exist for dolphin-safe tuna, fair-trade coffee, non-biotech corn oil, country-of-origin, or any other process attribute. Traceability systems help create markets for foods with and without these attributes.

Food Safety and Quality Control. Traceability systems help firms minimize the production and distribution of unsafe or poor-quality products, which in turn minimizes the potential for negative publicity, liability, and recalls. The better and more precise the tracing system, the faster a producer can identify and resolve food safety or quality problems. By themselves, traceability systems do not produce safer or higher quality products. These systems help buttress the overall safety system, providing information about whether or not control points in the production or supply chain are operating correctly. Firms have established traceability and quality control systems to control risks such as pathogen growth; accidental or malicious contamination; and contamination with glass, pits, buckshot, needles, rocks, or animal droppings.

Many buyers, including many restaurants and some grocery stores, now require their suppliers to establish safety/quality traceability systems and to verify, often through third-party certification, that such systems function as required. Most, if not all, third-party food-safety/quality certifiers such as the Swiss-based Société Générale de Surveillance (SGS) and the American Institute of Baking (AIB) recognize traceability as the centerpiece of a firm's safety management system. The growth of third-party standards and certifying agencies is helping to push the whole food industry—not just those firms that employ third-party auditors-toward documented, verifiable traceability systems.

If firms inadvertently distribute unsafe or low-quality food for sale, traceability systems can help them track product distribution and target recall activities, thereby limiting damage and liability. Most, if not all, voluntary recalls listed on USDA's Food Safety and Inspection Service website refer consumers to coded information on products' packaging to identify the recalled items. The advent of grocery store or club cards to track sales enhances the potential for targeted recall information.

The three objectives outlined have generated a widespread need for efficient and effective traceability systems. Yet the prior art has not provided a solution which encompasses the necessary range. For example, a traceability system for decaffeinated coffee would extend back to the processing stage; for fair-trade coffee would extend to information on price and terms of trade between coffee growers and processors; for fair wage would extend to harvest; for shade-grown, to cultivation; and for non-genetically engineered, to the bean or seed.

Similarly, for food safety, the depth of the traceability system depends on where hazards and remedies can enter the food production chain. For some health hazards, such as Bovine Spongiform Encephalopathy, ensuring food safety requires establishing safety measures at the farm. For other health hazards, such as bacterial pathogens, firms need to establish critical control points along the entire production and distribution chain.

The unit of analysis, whether container, truck, crate, day of production, shift, feedlot, or any other unit, is the tracking unit for the traceability system. In some cases, the objectives and characteristics of the system will dictate a very precise system with a smaller unit of analysis, while for other objectives a less precise system will suffice. For example, in bulk grain markets a less precise system of traceability from the elevator back to the farm is usually sufficient because the elevator serves as a key quality control point for the grain supply chain. Elevators clean and sort deliveries by variety and quality, such as protein level. Elevators then blend shipments to achieve a homogenous quality and to meet sanitation and quality standards. Once blended, only the new grading information is relevant; there is no need to track back to the farm to control for quality problems. Strict segregation by farm would thwart the ability of elevators to mix shipments for homogenous product and would not be necessary for safety or quality assurance.

Businesses balance the benefits of their traceability objectives against the costs to determine the efficient breadth, depth, and precision of their traceability systems. Firms will collect information on an attribute and track its flow through the supply chain only if the net benefits of doing so are positive. Likewise, they will invest in precision to the extent that the benefits outweigh the costs.

Traceability systems are a tool to help firms manage the flow of inputs and products to improve efficiency, differentiate products, maintain food safety, and maintain product quality. However, to be most effective, a traceability system must be paired with an inventory-control system, such as a real-time delivery system.

A common characteristic, and limitation, of the prior art inventory management and tracking techniques and systems is that they are focused primarily on intra-enterprise inventory. At best, the prior art inventory management and tracking techniques and systems may take into consideration one additional player, so that the system or technique results in tracking inventory for only a manufacturer/raw material supplier or retailer/distributor relationship.

This deficiency in the prior art prevents accurate and current inventory auditing, accurate demand-driven forecasting based on accurate and current inventory audit information, and end-to-end inventory tracking in a chain of possession or a supply channel. In June 2003, the USDA announced plans for a livestock tracking system in which cattle, sheep, and other livestock would be tagged at birth under a planned network that could help contain, for example, a mad cow scare. However, no system has yet emerged from this effort.

Relation of the inventive subject matter to the National Animal Identification System ("NAIS"). Recognizing the need for a system to track livestock animals, NAIS is a national program intended to identify animals and track them as they come into contact with, or commingle with, animals other than herdmates from their premises of origin. Currently, working groups comprised of industry and government representatives are developing plans for cattle, swine, sheep, goats, horses, poultry, bison, deer, elk, llamas, and alpacas.

In April 2004, the U.S. Department of Agriculture ("USDA") announced a program to develop an animal identification and tracking system that would be used in all States and that would operate under national standards. The goal of the system is to be capable of tracing a sick animal or group of animals back to the herd or premises that is the most likely source of infection. It will also be able to trace potentially exposed animals that were moved out from that herd or premises. It is thought that the sooner animal health officials can identify infected and exposed animals and premises, the sooner they can contain a disease and stop its spread. A long term goal is to establish a system that can identify all premises and animals that have had direct contact with a foreign animal disease or a domestic disease of concern within 48 hours of discovery.

Knowing where animals are located is the key to efficient, accurate, and cost-effective epidemiologic investigations and disease-control efforts. The first steps in implementing the NAIS are identifying and registering premises that house animals, and identifying individual animals.

USDA is currently only developing standards for collecting and reporting limited information. With the stated intent not to increase the size and scope of Federal or State governments and to maintain confidentiality of information beyond that information necessary for animal health officials to be able to track suspect animals and identify any other animals that may have been exposed to a disease, successful achievement of the program goals requires State, Federal, and industry partnerships and cooperation. Thus, NAIS will contain only certain basic data must be readily available to the Federal government.

In order to fully track and control livestock inventory, a superior system should be able to collect and maintain more information than is required for the NAIS.

Meeting this need, the inventive systems, the inventive methods, and the inventive computer software products track individual livestock inventory items at given time(s), using periodic survey(s), and/or scan-in/scan-out accounting, throughout a chain of possession or a supply channel. Thus, the inventive subject matter provides accurate and current inventory auditing, provides more accurate demand-driven forecasting based on accurate and current inventory audit information, and provides end-to-end inventory tracking in a chain of possession or a supply channel.

The present invention allows inventory tracking and management through a combination of manual, semi-automated, and automated means. The present invention also allows a manager to purchase in bulk and take advantage of promotions and other special offerings, thus reducing inventory costs. In addition, the present invention reduces the amount of inventory which must be kept on-hand by accurately modeling and predicting inventory needs. The present invention further provides customers with the ability to review new equipment, communicate with each other, and buy and sell excess inventory, refurbished equipment, and the like.

Inventive Systems

The inventive subject matter relates to a livestock inventory management system, comprising the following elements, operably connected:
  (a) at least one computer having at least one storage medium;
  (b) one or more databases residing on said at least one storage medium;
  (c) data collection software providing an interface to said one or more database(s);
  (d) one or more unique readable identifiers accompanying a livestock animal;
  (e) one or more data collection locations in communication with said at least one computer, each having:
    (i) a reader appropriate to at least one unique identifier accompanying a livestock animal and capable of reading said at least one unique identifier, and
    (ii) a data measurement device; and
  (f) a timing device,
wherein said software executes the following actions:
  (i) storing in said one or more databases at least one data item measured by a data measurement device and associated with the unique readable identifier for a livestock animal, captured at a first time,
  (ii) storing in said one or more databases at least one data item measured by a data measurement device and associated with the unique readable identifier for said livestock animal, captured at a second time,
  (iii) generating and outputing a report of said at least two data items,
  (iv) tracking a livestock inventory item and updating at least one database for (1) said customer and (2) a livestock merchant, as livestock inventory items are added to, restocked to, or removed from inventory, (v) evaluating customer inventory information and inventory or cost information for a plurality of livestock merchants of said livestock animal in light of restocking parameters provided by said customer, and (vi) automatically ordering livestock merchant inventory which best fulfills said inventory restocking parameters provided by said customer.

In another aspect, said at least one unique identifier accompanying a livestock animal is selected from the group consisting of a barcode, an RFID tag, and a biometric feature.

In a preferred embodiment, said at least one unique identifier is an RFID tag.

In another aspect, said data measurement device is selected from the group consisting of devices which measure location, temperature, humidity, oxygen content, and other environmental conditions.

In another aspect, said first time is at the time of birth of said livestock animal.

In another aspect, said second time is at the time of sale to a consumer.

In another aspect, said software stores in said one or more databases one or more additional data items measured by at least one data measurement device and associated with the unique readable identifier for a livestock animal, captured at third and succeeding times intervening said first and second times.

In a preferred embodiment, said one or more additional data items are associated with a livestock merchant.

In another aspect, said report is output in response to a query.

In another aspect, said report is output automatically.

In another aspect, said data collection location is in communication with said at least one computer via the internet.

In another aspect, said software additionally forecasts the inventory needs of said customer or said livestock merchant based on inventory usage, or inventory availability trends, or both, wherein said evaluation of customer inventory information and livestock merchant inventory and cost information is executed in light of said restocking parameters provided by said customer and said forecast inventory needs.

In another aspect, said software monitors inventory levels and reports anticipated shortages.

In another aspect, said software monitors inventory levels and generates orders to cover anticipated shortages.

In another aspect, said software allows users to order new inventory items or to supplement inventory when desired.

In another aspect, said customer inventory information is collected and stored for multiple customer business sites or for multiple customers, and wherein inventory restocking parameters provided by said customer are collected and stored for each said customer.

In another aspect, said inventory and cost information is collected and stored for multiple livestock merchants.

In another aspect, said step of updating takes place in real time.

In a preferred embodiment, said detecting of an RFID tag associated with each said inventory item is executed by one or more RFID readers.

In another preferred embodiment, RFID tag is read by a hand held electronic device.

In a further preferred embodiment, RFID tag is read by an electronic portal device.

In another aspect, said software allows inventory items to be grouped, allows restrictions to be placed on distribution of such inventory items, provides for recording of information when an inventory item belonging to a group is dispensed, and allows printing of inventory item specific information for inclusion with each inventory item removed from inventory.

In another aspect, said software allows users to specify a price for goods for sale within an inventory.

In another aspect, a user of the computer program is identified via an optical reader which can read specially coded information on a person.

In another aspect, a user of the computer program is identified via an electronic device for scanning wirelessly accessible identifiers associated with a person.

In another aspect, a user of the computer program is identified via a biometric identification device.

Inventive Methods

The inventive subject matter relates to a computer implemented method for livestock inventory management, comprising the steps of:

(a) at one or more data collection locations having a reader appropriate to at least one unique identifier accompanying a livestock animal and a data measurement device, measuring, collecting, and storing, in one or more databases on one or more storage media, maintained on one or more computers, at least the following data:

(i) at least one data item measured by a data measurement device and associated with a unique readable identifier for a livestock animal, captured at a first time, and (ii) at least one data item measured by a data measurement device and associated with a unique readable identifier for said livestock animal, captured at a second time;

(b) generating and outputting a report of said at least two data items;

(c) tracking a livestock inventory item and updating at least one database for (1) said customer and (2) a livestock merchant, as livestock inventory items are added to, restocked to, or removed from inventory;

(d) evaluating customer inventory information and inventory or cost information for a plurality of livestock merchants of said livestock animal in light of restocking parameters provided by said customer;

(e) automatically ordering livestock merchant inventory which best fulfills said inventory restocking parameters provided by said customer; and (f) providing access via software to information in said one or more databases to each said customer and livestock merchant, wherein said software allows one or more customers and livestock merchants to be classified into groups, and where permissions or roles are assigned to such groups.

In another aspect, said at least one unique identifier accompanying a livestock animal is selected from the group consisting of a barcode, an RFID tag, and a biometric feature.

In a preferred embodiment, said at least one unique identifier is an RFID tag.

In another aspect, said measured data is selected from the group consisting location, temperature, humidity, oxygen content, and other environmental conditions.

In another aspect, said first time is at the time of birth of said livestock animal.

In another aspect, said second time is at the time of sale to a consumer.

In another aspect, the inventive subject matter comprises collecting and storing in said one or more databases one or more additional data items measured by at least one data measurement device and associated with the unique readable identifier for a livestock animal, captured at third and succeeding times intervening said first and second times.

In a preferred embodiment, one or more additional data items are associated with a livestock merchant.

In another aspect, said report is output in response to a query.

In another aspect, said report is output automatically.

In another aspect, said data collection location is in communication with said at least one computer via the internet.

In another aspect, the inventive subject matter comprises the additional step of forecasting the inventory needs of customers and livestock merchants based on inventory usage or inventory availability trends,
wherein said step of evaluating said customer inventory information and said livestock merchant inventory and cost information is executed in light of restocking parameters provided by said customer and forecast inventory needs.

In another aspect, said step of ordering is completed automatically based upon the evaluation of said customer inventory information and said livestock merchant inventory and cost information, in light of restocking parameters provided by said customer.

In another aspect, said aid method comprises the additional step of forecasting inventory usage or inventory availability for each said customer and livestock merchant, based upon customer and livestock merchant information.

In another aspect, said method comprises the additional steps of monitoring inventory levels and reporting anticipated shortages.

In another aspect, said method comprises the additional steps of monitoring inventory levels and generating orders to cover anticipated shortages.

In another aspect, said method comprises the additional steps of monitoring inventory levels and generating orders to cover anticipated shortages.

In another aspect, said method comprises the additional step of providing for users to order inventory items or to supplement inventory when desired.

In another aspect, said customer inventory information is collected and stored for multiple customer business sites or for multiple customers, and wherein inventory restocking parameters provided by said customer are collected and stored for each said customer.

In another aspect, said inventory and cost information is collected and stored for multiple livestock merchants.

In another aspect, said step of updating takes place in real time.

In another aspect, said step of reading said RFID tag is by a hand held electronic device.

In another aspect, said step of reading said RFID tag is by an electronic portal device.

In another aspect, the inventive subject matter comprises the additional step of identifying specially coded information on an object or a person via an optical reader.

In another aspect, the inventive subject matter comprises the additional step of identifying a wirelessly accessible identifier associated with an object or a person via an electronic device for scanning wirelessly accessible identifiers.

In another aspect, the inventive subject matter comprises the additional step of identifying a user via a biometric identification device.

Inventive Computer Program Products

The inventive subject matter relates to a computer program product for managing customer inventory, comprising program instructions stored on at least one computer readable storage medium which when executed cause a computer to:
(a) collect and store, on one or more databases, at least the following data:
(i) at least one data item measured by a data measurement device and associated with a unique readable identifier for a livestock animal, captured at a first time, and
(ii) at least one data item measured by a data measurement device and associated with a unique readable identifier for said livestock animal, captured at a second time;
(b) generate and output a report of said at least two data items;
(c) evaluate said customer inventory information and inventory or cost information for a plurality of livestock merchants in light of said restocking parameters provided by said customer;
(d) order livestock merchant inventory which best fulfills said inventory restocking parameters provided by each said customer;
(e) track inventory items for (1) each customer and (2) each livestock merchant, as inventory items are added to, restocked to, or removed from inventory,
(f) update said data on said one or more databases; and
(g) provide access to the information in said one or more databases to said customer and livestock merchant,
wherein said computer program product allows customers and livestock merchants to be classified into groups, and where permissions or roles are assigned to such groups.

In another aspect, said at least one unique identifier accompanying a livestock animal is selected from the group consisting of a barcode, an RFID tag, and a biometric feature.

In a preferred embodiment, said at least one unique identifier is an RFID tag.

In another aspect, said measured data is selected from the group consisting location, temperature, humidity, oxygen content, and other environmental conditions.

In another aspect, said first time is at the time of birth of said livestock animal.

In another aspect, said second time is at the time of sale to a consumer.

In another aspect, the inventive subject matter comprises collecting and storing in said one or more databases one or more additional data items measured by at least one data measurement device and associated with the unique readable identifier for a livestock animal, captured at third and succeeding times intervening said first and second times.

In a preferred embodiment,

In another aspect, said one or more additional data items are associated with a livestock merchant.

In another aspect, said report is output in response to a query.

In another aspect, said report is output automatically.

In another aspect, said data collection location is in communication with said at least one computer via the internet.

In another aspect, the inventive subject matter comprises program instructions for allowing the forecasting of inventory needs of said customer and livestock merchant based on inventory usage or inventory availability trends,
wherein said evaluation of customer inventory information and livestock merchant inventory and cost information is executed in light of said restocking parameters provided by said customer and said forecast inventory needs.

In another aspect, the inventive subject matter comprises program instructions for:
(1) monitoring inventory levels; and
(2) reporting anticipated shortages.

In another aspect, the inventive subject matter comprises program instructions for:

(1) monitoring inventory levels; and (2) generating orders to cover anticipated shortages.

In another aspect, the inventive subject matter comprises program instructions for allowing users to order inventory items or to supplement inventory when desired.

In another aspect, the inventive subject matter comprises program instructions wherein said step of ordering is completed automatically based upon the evaluation of said customer inventory information and said livestock merchant inventory and cost information in light of said restocking parameters provided by said customer.

In another aspect, the inventive subject matter comprises program instructions for allowing said step of updating to take place in real time.

In another aspect, the inventive subject matter comprises program instructions for providing access to the information in said one or more databases, according to said assigned roles or permissions, to a user of the computer program identified via an optical reader which can read specially coded information on a person.

In another aspect, the inventive subject matter comprises program instructions for providing access to the information in said one or more databases, according to said assigned roles or permissions, to a user of the computer program identified via an electronic device for scanning wirelessly accessible identifiers associated with a person.

In another aspect, the inventive subject matter comprises program instructions for providing access to the information in said one or more databases, according to said assigned roles or permissions, to a user of the computer program identified via a biometric identification device.

In another aspect, the inventive subject matter comprises program instructions for enabling registration and removal of individual users of the computer program product and modification of user information.

In another aspect, the inventive subject matter comprises program instructions for performing administrative functions.

In another aspect, the inventive subject matter comprises program instructions for:

(1) allowing inventory items to be grouped into classifications;

(2) allowing restrictions to be placed on distribution of such inventory items;

(3) providing for recording of information when individual inventory items or inventory items belonging to a particular group or set of groups are added to, restocked to, or removed from inventory; and (4) allowing printing of inventory item specific or group specific labels or information to be included with each inventory item removed from inventory.

In another aspect, the inventive subject matter comprises program instructions for allowing users to specify a price for goods for sale within an inventory.

In another aspect, the inventive subject matter comprises program instructions for allowing detection of an RFID tag associated with each said inventory item to be executed by one or more RFID readers.

In another aspect, the inventive subject matter comprises program instructions for allowing said RFID tag to be read by a hand held electronic device.

In another aspect, the inventive subject matter comprises program instructions for allowing said RFID tag to be read by an electronic portal device.

While the preferred embodiment and various alternative embodiments of the present invention are disclosed and described in detail herein, it will be apparent to those skilled in the art that various changes in form and detail may be made therein without departing from the spirit and scope thereof, including applying the present invention to fields other than livestock inventory management.

Thus, the following embodiments are illustrative of the inventive subject matter and are not intended to be limitations thereon.

EXAMPLE 1

Data Management Flow Process for Livestock Inventory

Figure 14:
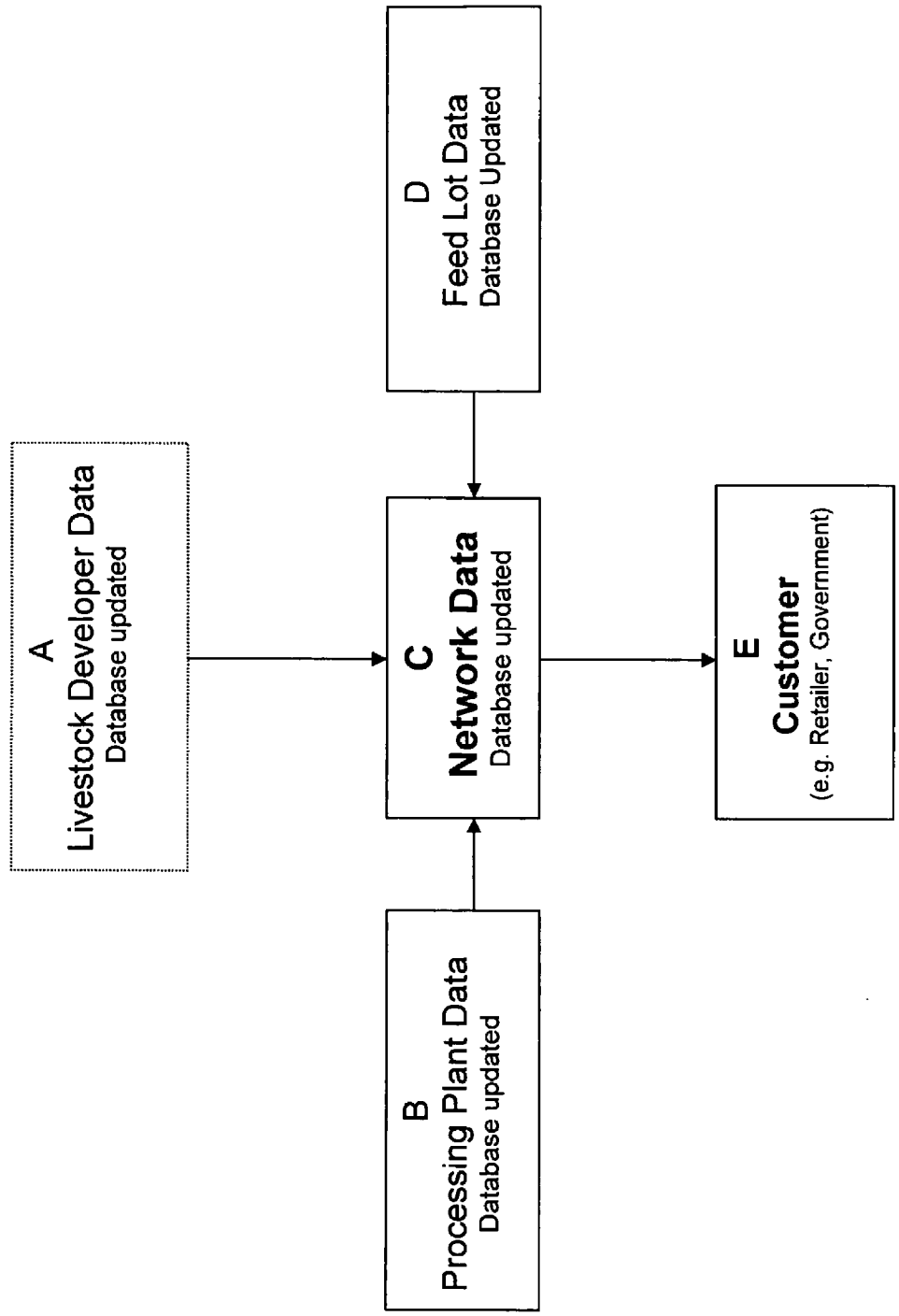
FIG. 14 is a drawing which illustrates an exemplary integrated system of connections between customers, livestock developers, feed lots, and processing plants managed through a centralized network with redundant databases, according to one aspect of the inventive subject matter.

In the embodiment of the inventive subject matter shown in FIG. 14, a Livestock Developer (Box A) updates the database, on a local level, through a storage medium, as to the inventory level and data associated with an inventory item; this data is optionally synchronized with a replicated database at a network data center (Box C). The network data provides the Livestock Developer with Feed Lot data, Processing Plant data, and Customer data based on permissions or roles as they are assigned.

Processing Plant (Box B) data is updated on a local level and synchronized with the network data center as to the inventory item breakdown process (if applicable) by item, to provide tracing back to the origin of development.

Feedlot (Box D) data is updated on a local level and also synchronized with the network data center.

A Customer (Box E), such as a government agency, restaurant, retailer, or wholesaler, can view data through a communication link to monitor the quality, source, and other data deemed important to the customer agency or business. End customer location data provides the network data center with the location of product, in order to notify the appropriate customer in the event the product is found to be harmful or dangerous to be consumed. Such notification can be made via e-mail, facsimile, or other communication to alert the Customer affected by an adverse event or result, such as a recall.

EXAMPLE 2

In one embodiment relating to a materials supply channel and inventory tracking for a business, the present invention improves upon the prior art by shifting the burden of inventory tracking onto a third party; this concept is referred to as vendor managed inventory, or VMI. When a third party provides VMI services for multiple companies, it gains significant buying power which it can use to negotiate better deals, improve supplier responsiveness, and streamline the buying process.

The present invention allows third-parties to monitor company inventory via the Internet and World Wide Web ("web"). In addition, the present invention allows small to medium sized companies to take advantage of VMI by providing a cost-effective solution to their inventory tracking needs.

The present invention utilizes web-enabled technologies to revolutionize inventory management by tracking inventory and automatically contacting livestock producers, feedlots, processing plants, and customers when quality or contamination issues arise, or when additional supplies are needed. This is expected to result in a labor reduction as compared to the labor-intensive inventory maintenance systems currently deployed, and to provide tracking capabilities which are not currently realized.

In addition to reducing labor costs, it is expected that the present invention will help a company cut other costs. It is also expected that the present invention will help reduce delivery costs by regularly ordering supplies in anticipation of need, thus obviating the need for express shipments. It is expected that the present invention will also allow third parties to take advantage of manufacturer or distributor specials when offered for the products its customers require, thus further reducing customer cost.

While purchasing is a large part of inventory maintenance, the present invention may also facilitate other transactions as well. For example, the present invention will allow customers to resell product or equipment inventory to other businesses, thereby maximizing utility. Although some in the prior art have attempted to provide business-to-business equipment resale through web-based auctions, auctions do not provide equipment availability assurances. The present invention provides a forum through which resellers and customers may interact, where the present invention acts as a broker, thereby assuring both that purchased equipment is delivered, and that a seller receives proper compensation.

FIG. 1 is a block diagram illustrating the major hardware components of one embodiment of the present invention. As illustrated in FIG. 1, the present invention utilizes a client/server architecture to facilitate communication between customer inventory systems and managers. A client running on a Customer Inventory System 130 may be used to track inventory, place special orders, and interact with other customers.

A client may include custom software, such as an application written in Visual Basic, JAVA, or C; commercial software, such as a web page accessible through a web browser; or a combination of custom and commercial software, such as a "plug-in" which operates in a web browser. Examples of common web browsers include Internet Explorer, developed by Microsoft Corporation of Redmond, Wash., and Navigator, developed by Netscape Corporation of Mountain View, Calif.

Customer Inventory Systems 130 may allow manual inventory tracking, semi-automated inventory tracking, or inventory may be dispensed using automated systems. By way of example, without intending to limit the present invention, a preferred embodiment of the present invention includes a handheld device, such as a Palm VII device by Palm Computing, Inc., to be outfitted with a barcode scanner. Such a device can allow barcodes or other identifiers associated with each inventory item to be scanned or otherwise entered into the system prior to or at the time of item distribution. As each item is scanned, a count maintained by the present invention may be adjusted to properly track inventory levels. Recipient-specific labels, including product warnings and other information, can then be printed for each scanned item.

Other inventory distribution methods contemplated include, but are not limited to, interfacing the present invention with vending machines. Vending machines may allow accurate inventory tracking without requiring human interaction, except to periodically restock a particular supply or group of supplies. In a preferred embodiment, vending machines may include security measures to prevent unauthorized supply distribution. Such security measures may include, but are not limited to, the use of an identification card and personal identification number ("PIN"), and biometric systems. Vending machines equipped with security systems may restrict access to specific supplies on an individual-by-individual level, or group-by-group basis. Vending machines may also be equipped with label printers that allow warnings and other information to be attached to a dispensed item's packaging.

Figure 5:
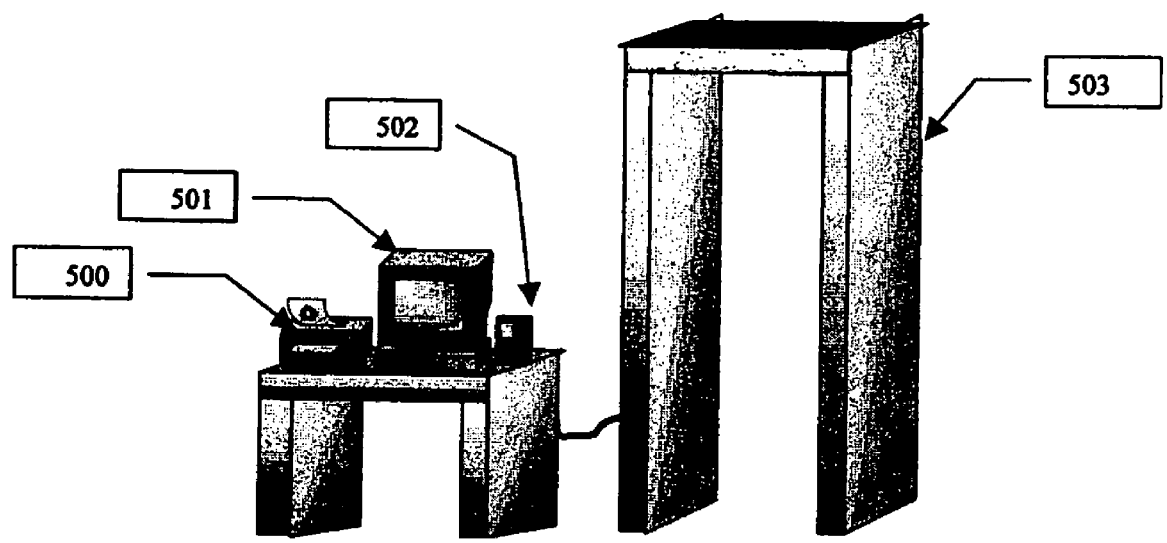
FIG. 5 illustrates a sample RFID portal and related computer equipment.
Figure 6:
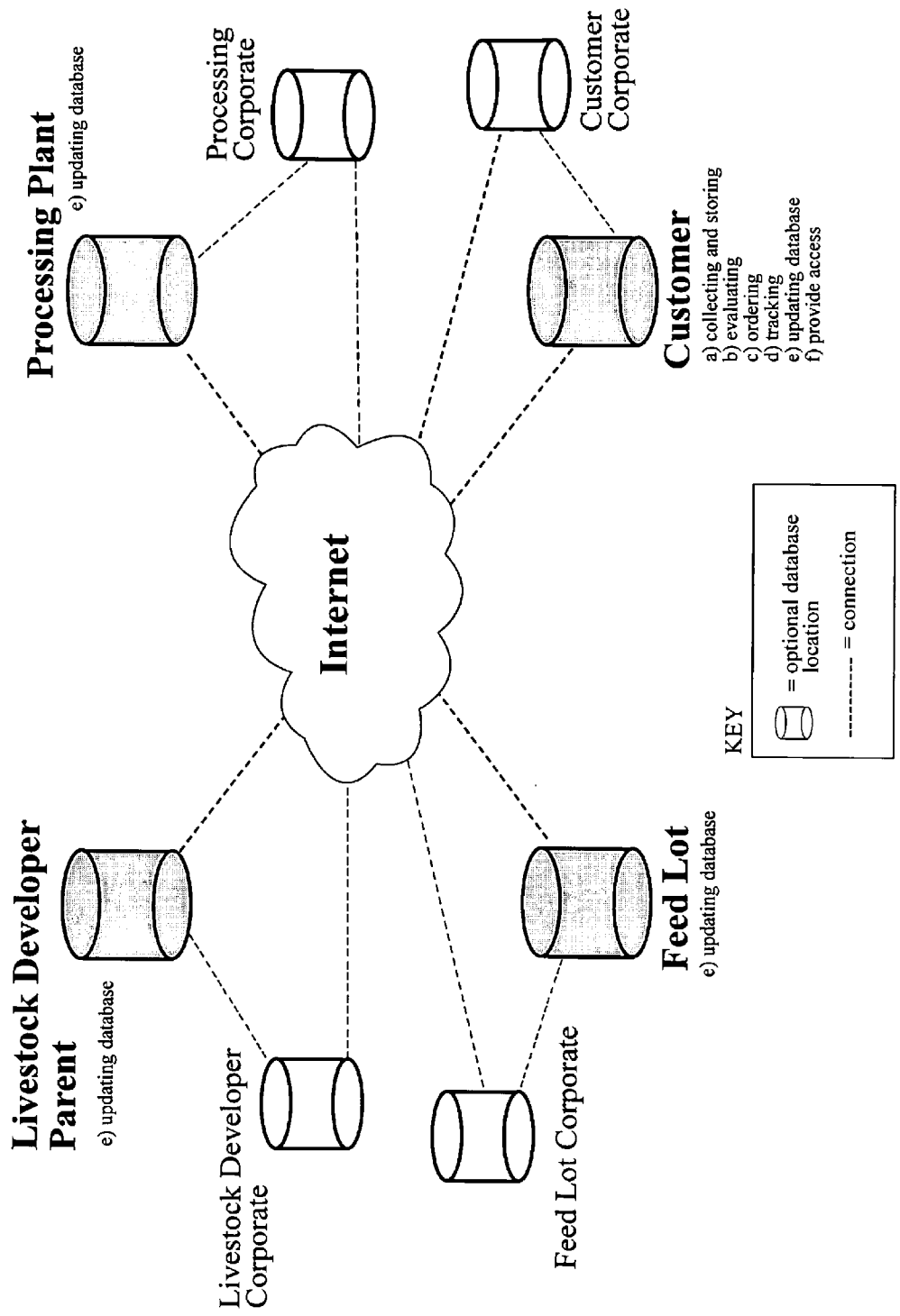
FIG. 6 is a drawing which depicts exemplary database locations and connections between customers and livestock merchants, according to one aspect of the inventive subject matter.
Figure 7:
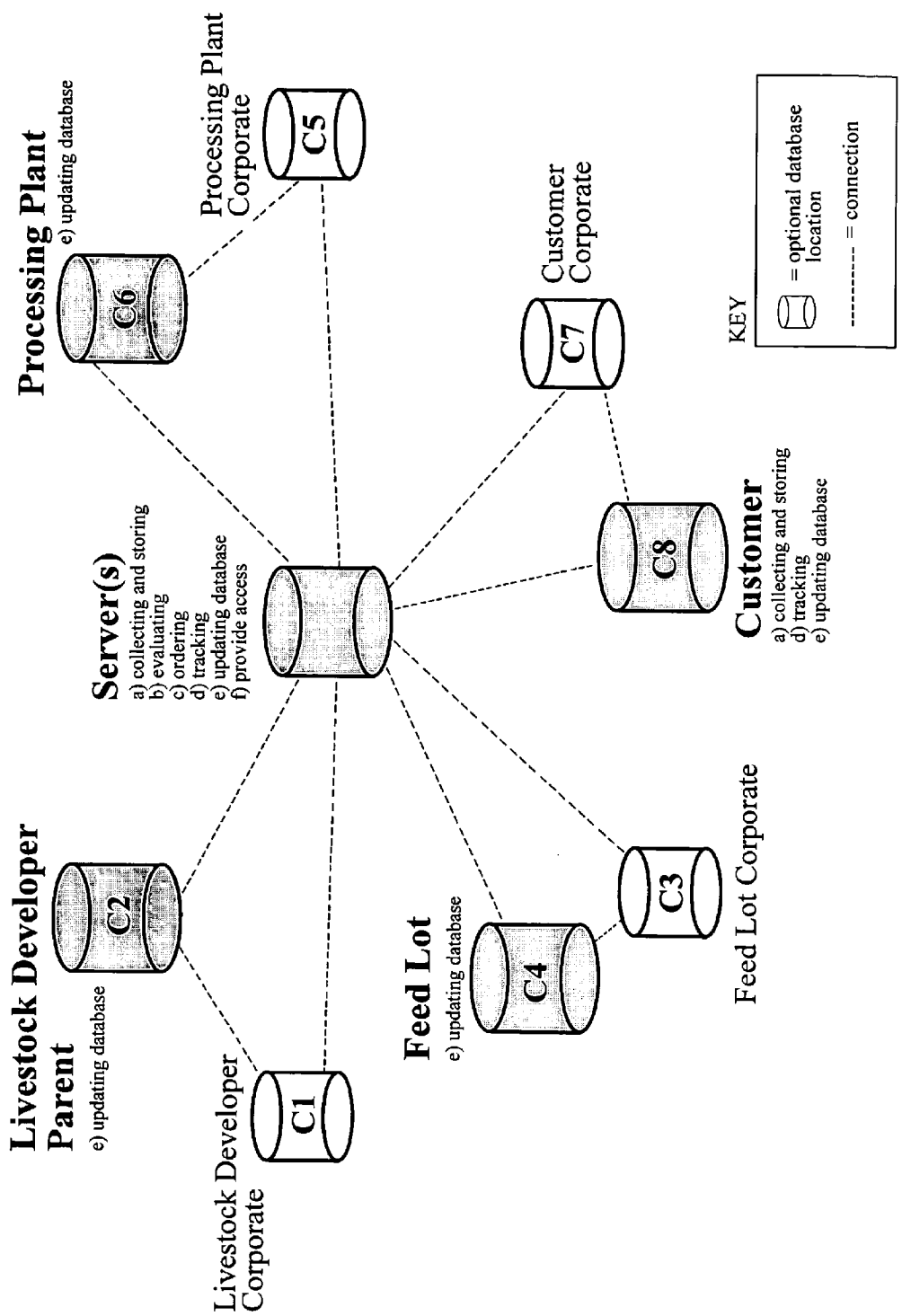
FIG. 7 is a drawing which depicts exemplary database locations and connections between customers and livestock merchants, according to another aspect of the inventive subject matter.
Figure 8:
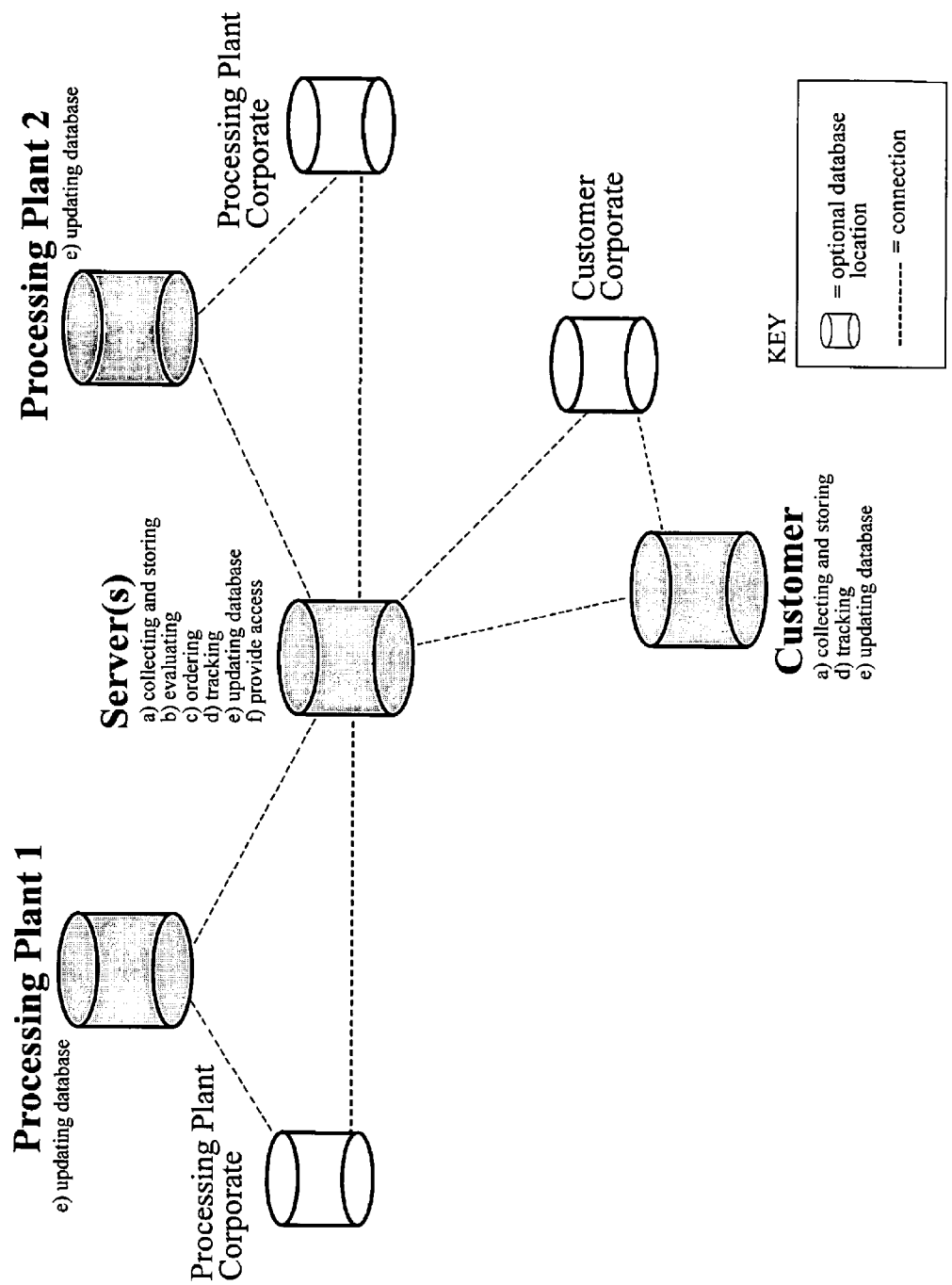
FIG. 8 is a drawing which depicts exemplary database locations and connections between customers and multiple processing plants, according to one aspect of the inventive subject matter.
Figure 9:
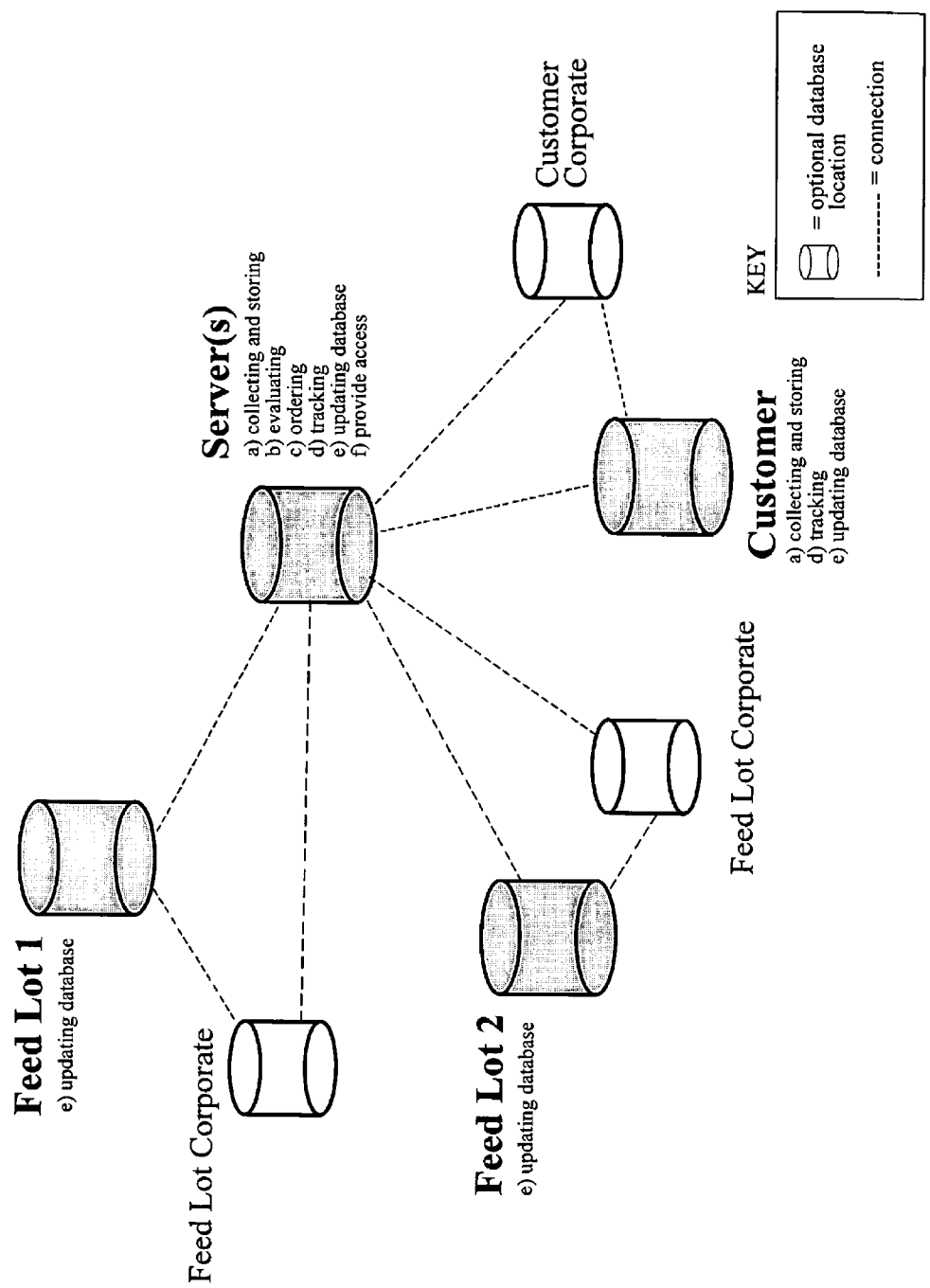
FIG. 9 is a drawing which depicts exemplary database locations and connections between customers and multiple feed lots, according to one aspect of the inventive subject matter.
Figure 10:
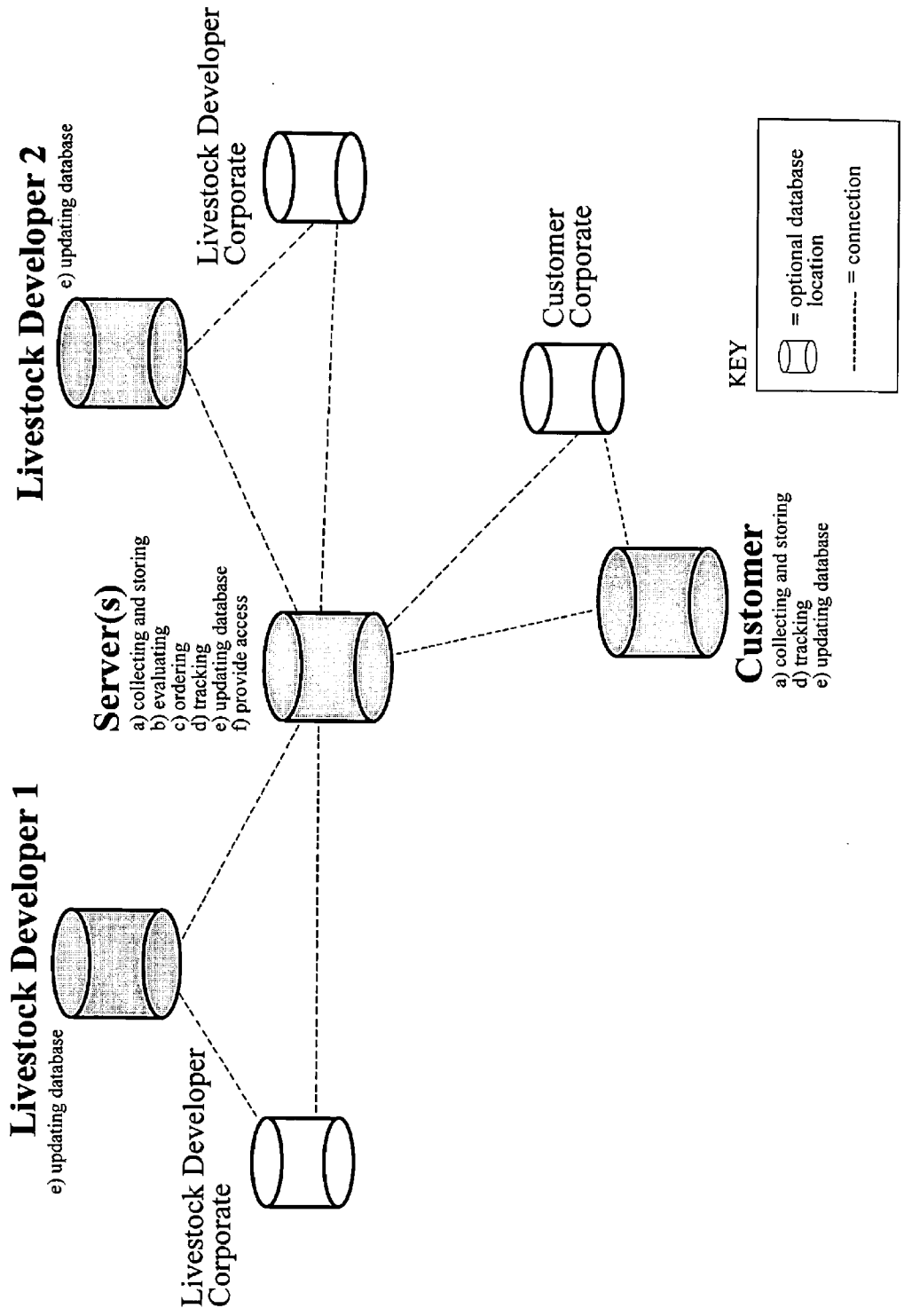
FIG. 10 is a drawing which depicts exemplary database locations and connections between customers and multiple livestock producers, according to one aspect of the inventive subject matter.
Figure 11:
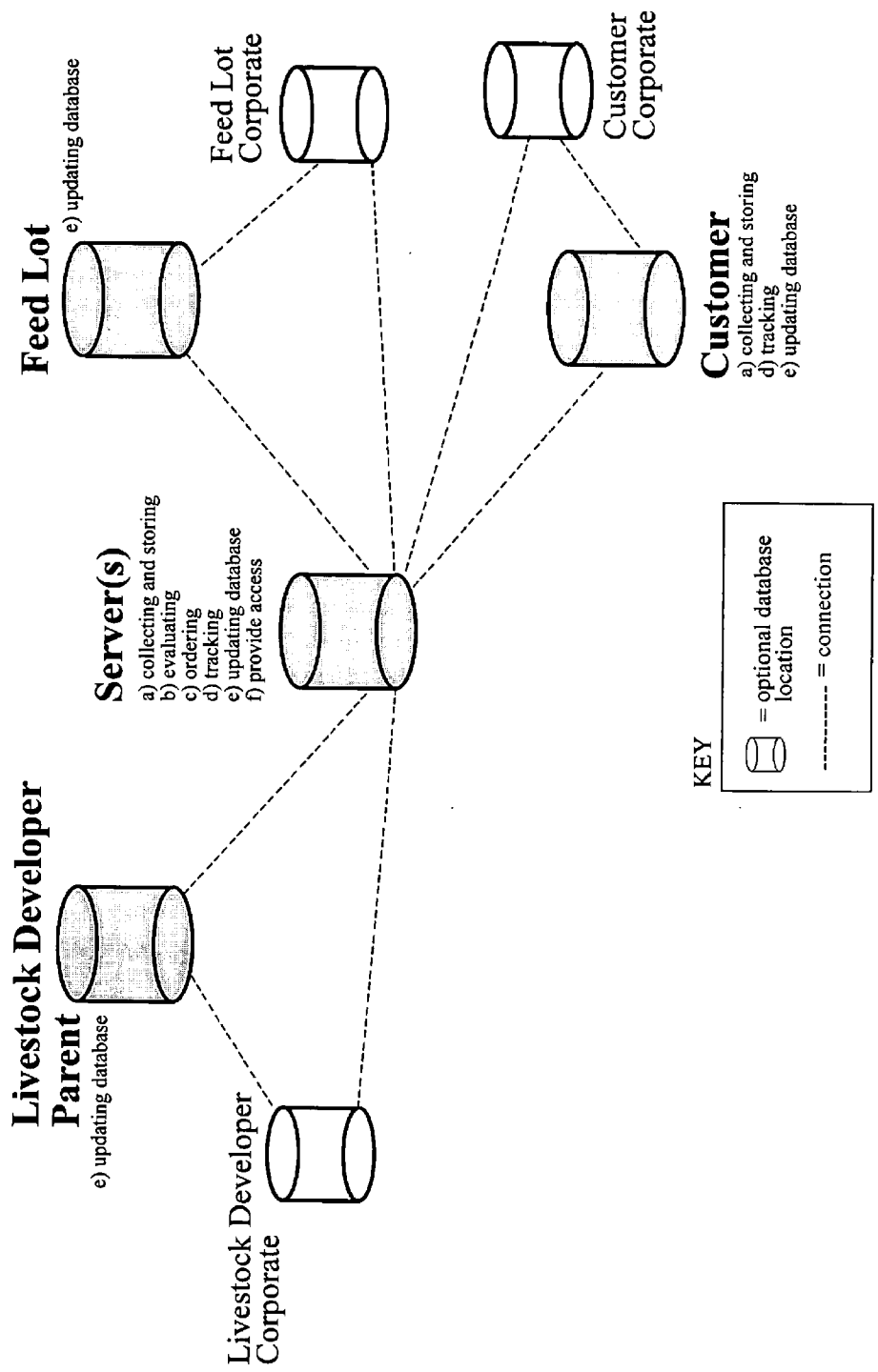
FIG. 11 is a drawing which depicts exemplary database locations and connections between customers, livestock producers, and feed lots, according to one aspect of the inventive subject matter.
Figure 12:
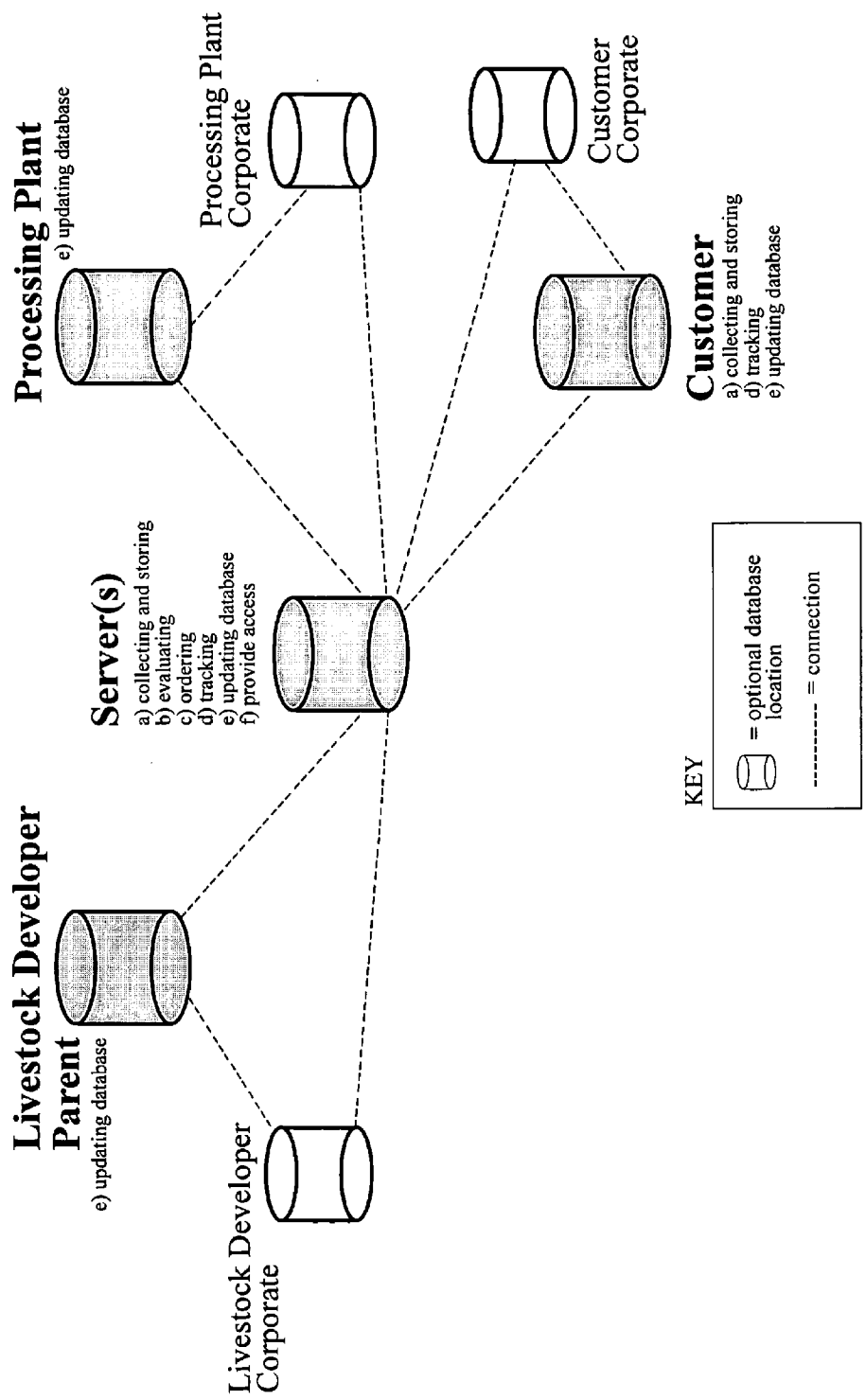
FIG. 12 is a drawing which depicts exemplary database locations and connections between customers, livestock producers, and processing plants, according to one aspect of the inventive subject matter.
Figure 13:
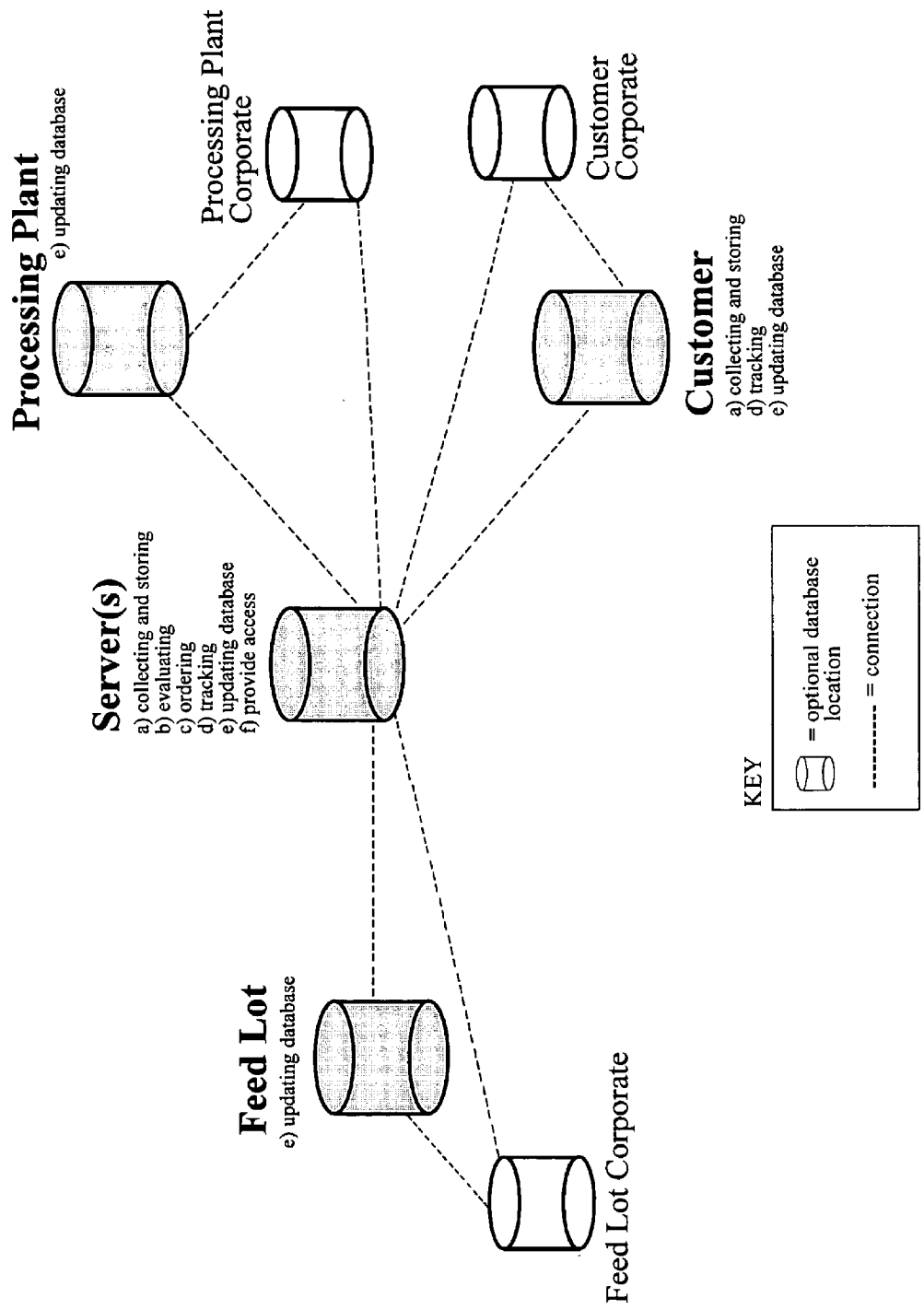
FIG. 13 is a drawing which depicts exemplary database locations and connections between customers, feed lots, and processing plants, according to one aspect of the inventive subject matter.

Alternatively, supply closets or other storage areas can be outfitted with a Radio Frequency Identification (RFID) portal, as illustrated in FIG. 5. An RFID portal (Block 500) is similar in structure to airport security metal detectors, except that RFID portals can detect or scan RFID tags as such tags pass through a portal. The present invention can monitor RFID tag identifiers, including identifiers assigned to individuals, such that access to a storage area can be monitored, and items removed by an individual can be tracked without any direct user interaction.

A preferred embodiment of the present invention can also track individual product dispensation, and may require additional information as products are dispensed. By way of example, without intending to limit the present invention, if a veterinarian dispenses medication to a livestock animal, the present invention may also request an inventory identifier. Inventory identifiers can be used by the present invention to generate dispensation history reports for individual animals, which may help livestock merchants to better understand genetic and environmental factors which may apply to genetically related animals, animals being raised under particular conditions, or animals being produced at particular locations.

In an alternative embodiment of the present invention, a veterinarian or other person may optionally carry a handheld device through which medication or diet modifications can be made while examining or otherwise obtaining data relating to an individual animal. Such a handheld device can connect to a local inventory management system through a wireless or wired means, and, when appropriate, a prescribed medication or diet item may be automatically dispensed through the inventory control system. Alternatively, a message may be displayed at an appropriate location, indicating the items to be pulled from inventory. When items are automatically dispensed or pulled from inventory, inventory counts can be decremented as appropriate, and new orders can be placed as necessary.

As inventory is distributed, Customer Inventory System 130 may track supply usage habits to determine minimum acceptable quantities on-hand. Usage information may be studied for various periods of time, and the present invention may create an inventory usage model based on collected data. As models are created and refined, the present invention may modify minimum in-stock thresholds to reflect anticipated usage. As quantity in-stock approaches a calculated or specified threshold, Customer Inventory System 130 may automatically request new supplies from Server 100. Supply requests may include various information, including, but not limited to, urgency of request, customer willingness to accept alternatives, billing information, and shipping information.

As Server 100 receives supply requests, Server 100 may request price quotes from several livestock merchants, shown in the drawings as "Distributor 120". Distributor 120 may respond with quantity available, price, estimated delivery time, and other such information. Server 100 may then automatically evaluate each Distributor 120 response to find the best value given various factors associated with each customer request. When an appropriate Distributor 120 response is chosen, Server 100 may automatically arrange payment and shipping of requested supplies for Customer Inventory System 130.

Communication between Customer Inventory System 130, Server 100, and Distributor 120 may be achieved through various methods, including, but not limited to, hypertext transfer protocol ("HTTP"), file transfer protocol ("FTP"), simple mail transfer protocol ("SMTP"), or other such related methods.

Although purchasing is a large part of inventory maintenance, a preferred embodiment of the present invention may also facilitate communication between customers, provide a source of information dissemination, and encourage customer interaction. The present invention may facilitate customer communication by allowing customers to resell products, equipment, or excess inventory to other businesses, and to quickly and efficiently communicate important information such as health warnings and pathogen outbreaks.

The present invention may also allow information dissemination by providing an up to date catalog of available equipment and other inventory from which a customer may order. The present invention may facilitate customer communication by allowing managers and customers to author and distribute articles describing new rules, regulations, procedures, revenue generation prospects, or other information of interest to other customers.

Customer Inventory System 100 may serve as the primary source of customer interaction with the present invention. Articles, catalogs, inventory information, and other such information may be stored on Server 100, and Customer Inventory System 100 may communicate with Server 100 to obtain requested information.

Figure 2:
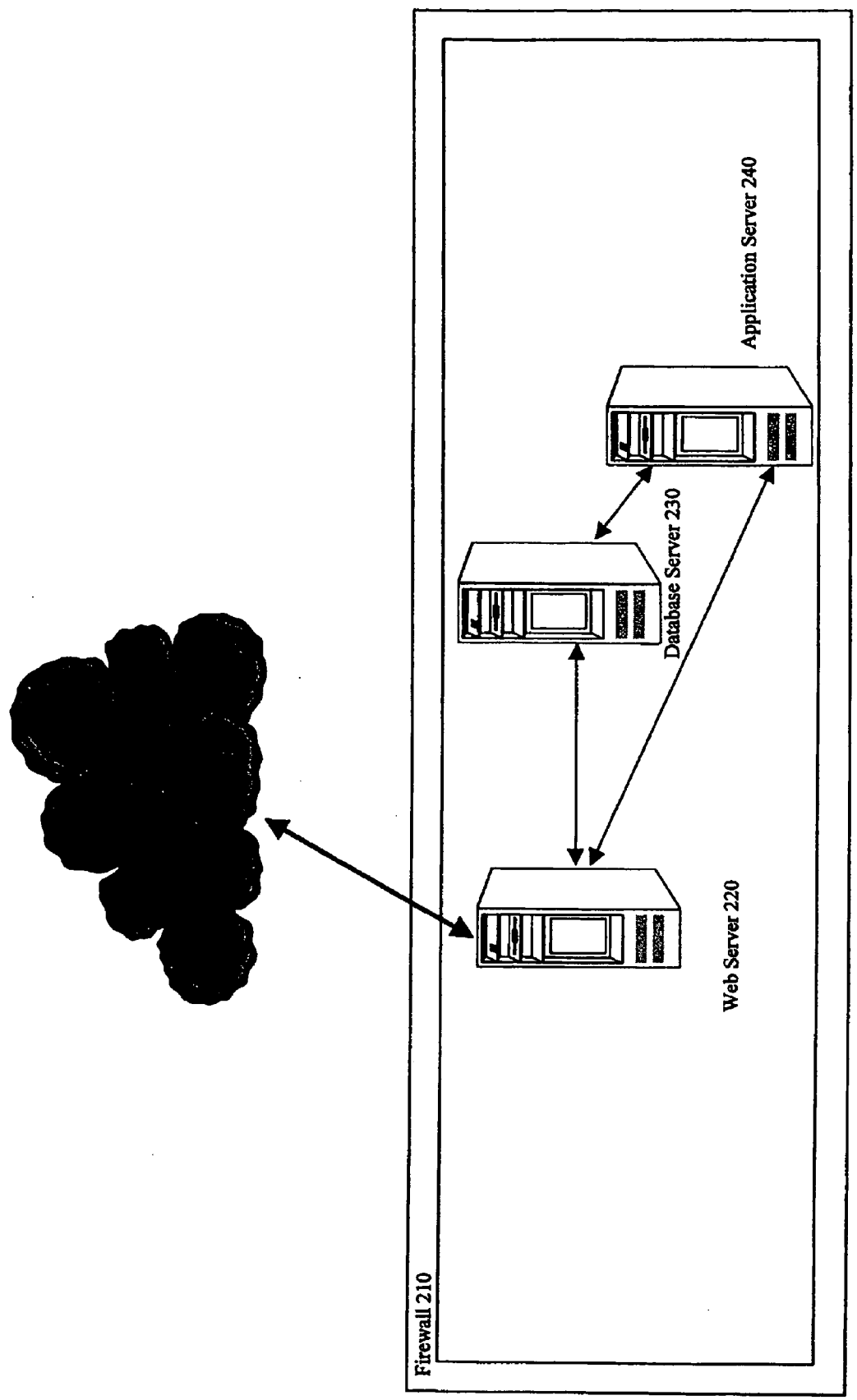
FIG. 2 is a block diagram illustrating an overview of the software components of the present invention.

FIG. 2 illustrates a preferred embodiment of Server 100, in which relationships between data storage, web server, and application services provided by Server 100 are illustrated. All client communications may first pass through Firewall 210. Firewall 210 represents a combination of software and hardware which is used to protect the data stored in Web Server 220, Database Server 230, and Application Server 240 from unauthorized access.

As previously described, clients may communicate with the present invention through various protocols, including HTTP. Web Server 220 represents software capable of transmitting and receiving information via HTTP or other protocols. Examples of such software include Internet Information Server, developed by Microsoft Corporation of Redmond, Wash.; Enterprise Server, developed by Netscape Corporation of Mountain View, Calif.; and Apache Server, developed by the Apache Software Foundation of Forest Hill, Md.

When a client requests information, Web Server 220 may determine whether a client request requires pre-processing, in which case a request is transferred to Application Server 240, or if a request simply requires data to fulfill the request, in which case Web Server 220 may communicate directly with Database Server 230.

Database Server 230 represents commercially available database software, such as Microsoft SQL Server, developed by Microsoft Corporation of Redmond, Wash., Oracle 8i, developed by Oracle Corporation, of Redwood Shores, Calif., or other, similar software. Database Server 230 may store raw data, such as customer inventory information, customer addresses, vendor names, vendor product classes, and other such similar information. Such information may be transmitted to a client by Web Server 220, or Application Server 240 may interpret information stored in Database Server 230 prior to transmission.

Application Server 240 may contain business rules associated with the present invention, which can be used to interpret Database Server 230 data prior to transmission of that data to a client. In addition to interpreting information stored in Database Server 230 for client use, Application Server 240 may also monitor inventory levels reflected in Database Server 230, contact vendors based on information from Database Server 230, adjust inventory information as new inventory is received, and provide the services necessary to facilitate business-to-business resale of equipment or products stored in Database Server 230.

Web Server 220, Database Server 230, and Application Server 240 each represent software which may run on the same computer, or on multiple computers. In addition, Application Server 240 may be implemented within Database Server 230 as a set of business rules.

An alternative description of the present invention follows, in which the present invention is described through a series of functional specifications. While the following functional specification describes a preferred embodiment of the present invention, descriptions within the functional specification should not be construed as limiting the present invention.

To avoid confusion, the following terms are used in this functional specification:

Customer—Refers to a buyer of products via the present invention. Customers can have "open account" relationships to avoid credit card and COD shipment problems.

Linked Supplier—A distinction is made to avoid confusion with other vendors doing business with the present invention, given that payables may be in a common accounts payable system. Distributors, manufacturers, or other vendors (collectively "suppliers"), are distinguished by whether they are using the present invention's inventory tracking and accounting software, and therefore have live Internet linkages into their databases for queries, order processing, and billing.

Manual Supplier—If a supplier provides goods or services through the present invention, but tracks inventory through a manual interface, such a supplier may be termed a "Manual Supplier". Open account relationships may be maintained between Linked or Manual Suppliers avoid payment complexities.

Non-linked Supplier—Suppliers not linked to the present invention.

Products—Items for sale via the present invention.

Customer Inventory—A list of products to be maintained at a given customer site.

In addition to the general definitions set forth above, this functions specification also defines a set of system functions. System functions may fall into one of the following general sub-system categories:

Interactive—human interface and related functions for tracking inventory counts, inventory consumption rates, ordering critical products, and the like. Interactive processes may be web-based or PC-based (client-server).

Nightly Processes—periodic processes through which orders can be generated and invoicing and related processes can be performed, including interaction with Distribution system at distributor warehouses.

Corporate—processes performed within corporate offices, but which update a database. Includes accounting, client data management, and other such processes.

Distribution—Linked Suppliers integrated with the present invention. Industry standard Enterprise Resource Planning (ERP) software may be bundled with commercial financial software to provide a complete business system to Linked Suppliers.

Database Design—A database schema which may be utilized in a preferred embodiment of the present invention.

The present invention in general, and this functional specification specifically, defines styles and functions included in detailed web pages and other user interface elements that are intended to be available system wide. Web pages, application windows, program screens, and transactions within the present invention should observe common rules. These rules include, but are not limited to: No customer can view, inquiry into, update or in any way alter another customers data. Transactions can use an IP address or other unique identifier as a cross-check against a customer ID coming in with transmitted pages to insure rule enforcement. For such security procedures, customer IP addresses or other unique identifiers may only be changed through a function accessible only to Corporate staff.

No Linked Supplier can see data belonging to another linked supplier.

System parameters controlling customer options can be set through an account setup and editing process. Such a process may be accessed by only someone with an authorized identifier. Initially, such identifiers may only be given to Corporate Staff.

Data changes will generally be reflected by a transaction log or transaction history, which may be accessible to customers or distributors, and to which Corporate Staff with appropriate security levels may have access.

Figure 3:
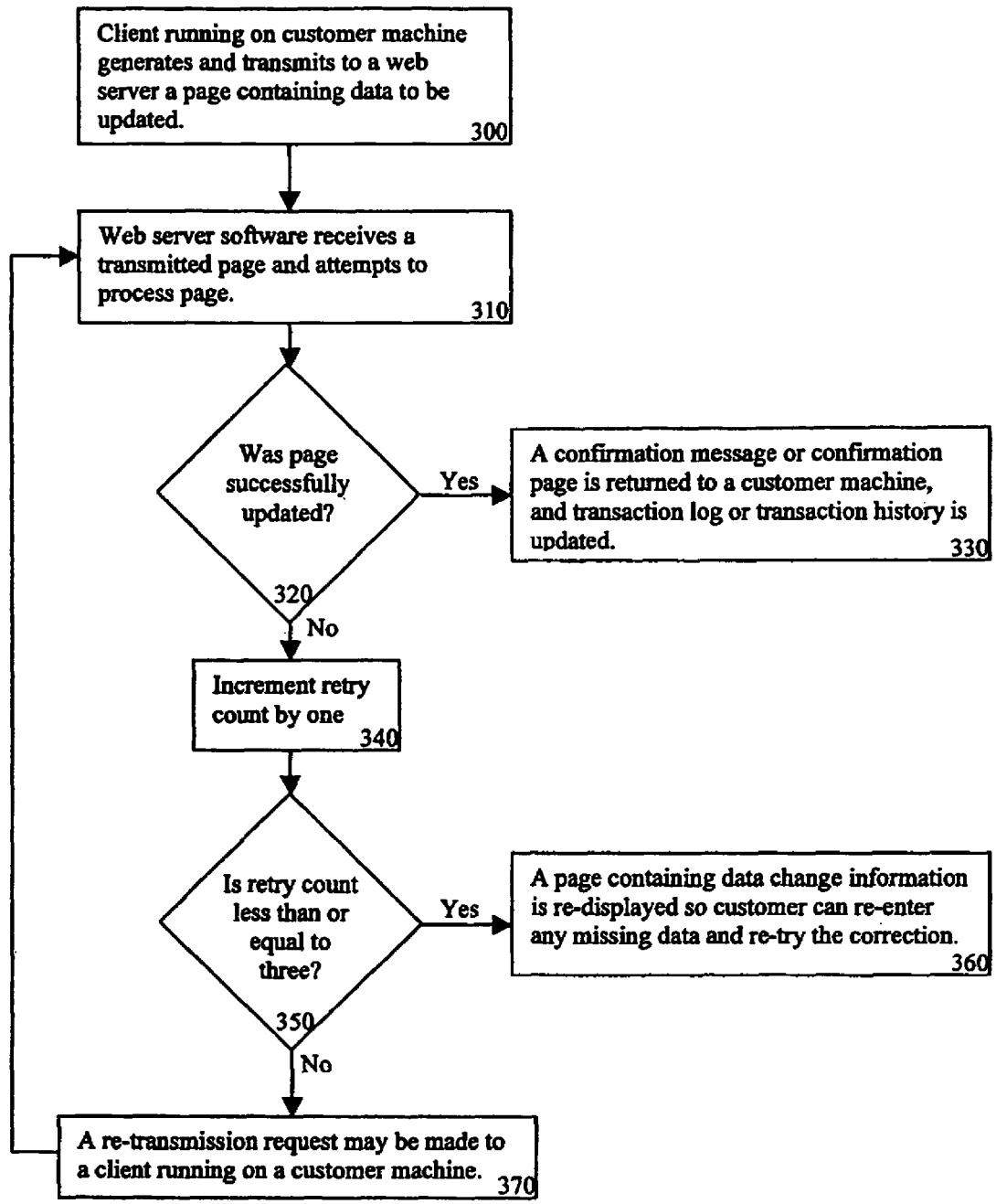
FIG. 3 is a process flow diagram illustrating sample logic implemented when client software attempts to update data stored in a server.

Functions involving data changes may be performed as server-side scripts, rather than through client-side logic. In general, such server-side scripts can utilize a logical flow similar to FIG. 3. As FIG. 3 illustrates, client software running on a customer machine may generate a page containing data to be updated by a web server and transmit said page to said web server (Block 300).

When a web server receives a page from a customer machine, the present invention may attempt to process any changes requested by said page. If such changes are successful (Block 320), the present invention may return a confirmation page or cause a confirmation message to be displayed to a customer machine, and appropriate transaction logging may occur.

If changes are not successful, the present invention may increment a retry count by one (Block 340). If the retry count is less than or equal to three, the present invention may retransmit customer changes (Block 370) to Block 310 in an effort to make any appropriate changes. If the retry count exceeds three (Block 350), the present invention may cause a page containing any error codes or other feedback information to be displayed on a client machine. Such a page may also contain original client data changes as well as a means for resubmitting said changes (Block 360).

Figure 4:
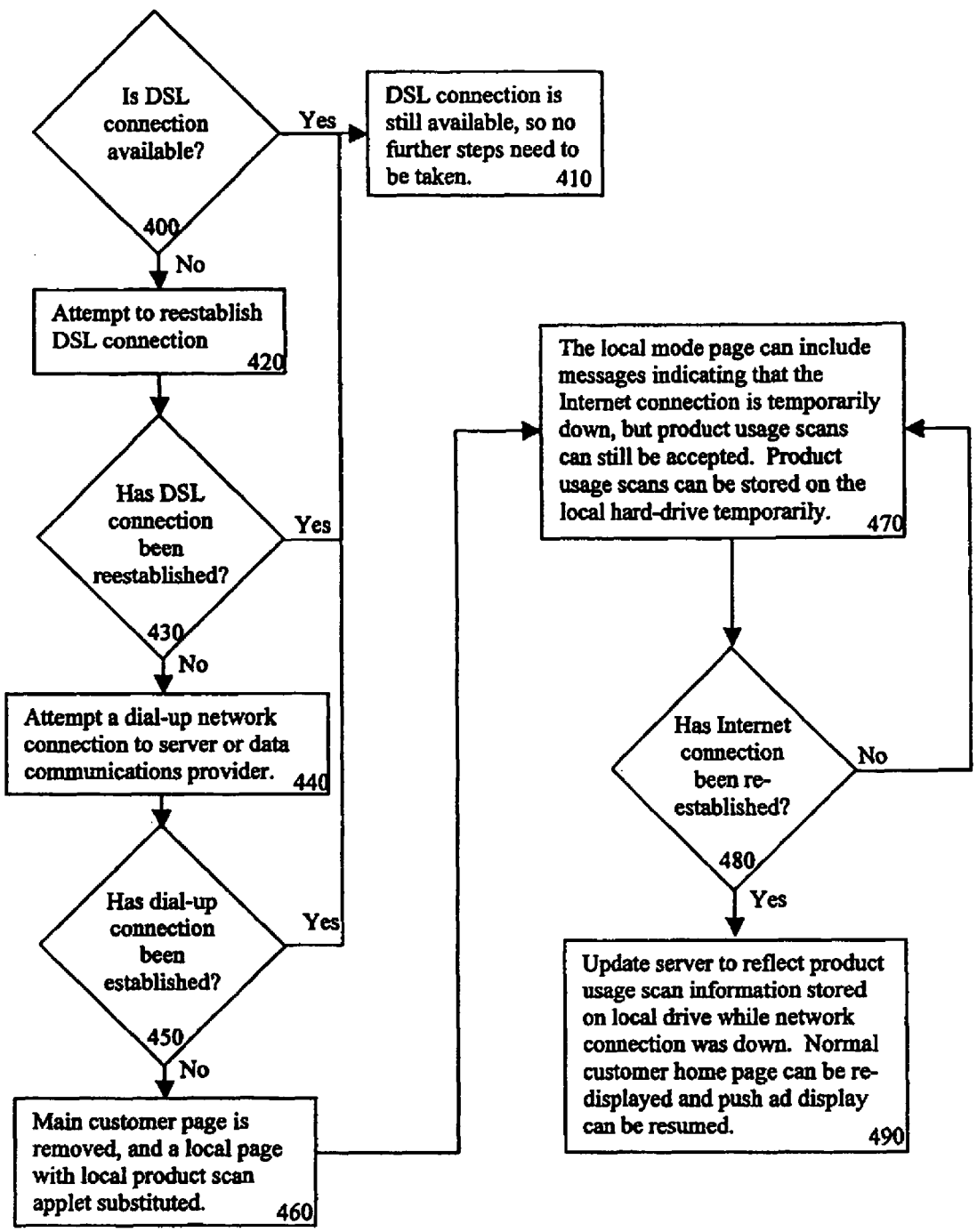
FIG. 4 is a process flow diagram illustrating sample logic implemented when client software polls a data connection.

Client software may also periodically verify that a data connection exists between said client software and a server acting as part of the present invention. Such software may follow the logic illustrated in FIG. 4 to achieve accurate data connection monitoring. As Block 400 illustrates, client software may send one or more TCP/IP Ping commands or other network test commands to verify that a high-speed connection is still available to a server acting as part of the present invention.

If a high-speed network connection is detected, the present invention can continue normal operations (Block 410). If a high-speed network connection is not detected, the present invention may attempt to reestablish such a connection (Block 420). If a high-speed network connection can be reestablished (Block 430), the present invention may continue normal operations (Block 410). If a high-speed network connection cannot be established, a lower speed network connection, such as a dial-up network connection, may be established by the present invention (Block 440). If a lower speed network connection can be established, the present invention may continue normal operations, including periodically attempting to reestablish a high-speed network connection (Block 410).

If a lower speed network connection cannot be established, client software may display an application or page with alternative user interface and alternative functionality (Block 460). Such alternative functionality can include local storage of product usage information, local inventory tracking, and limited reordering via a dial-up or other temporary connection with a known supplier (Block 470). A client functioning without a data connection may periodically attempt to reestablish high or low speed network connections (Block 480). When a connection is reestablished (Block 490), a client may transmit product usage scan information to a server acting as part of the present invention.

In addition to an inventory tracking application, the present invention may also utilize a high speed network connection to transmit new product offerings or special promotions to a client for display to a customer. As new products are entered into a Products table or similar data structure, the present invention may cause such a product to appear on a client. In a preferred embodiment, the present invention may allow customers to select products in which a customer is interested, and the present invention may only display new products or special deals meeting a customer's prior specifications. Such specifications can include, but are not limited to, categories by manufacturer, product trade name, specific product type, general product classification, and quantity available or quantity per shipping unit.

A client displaying such information may allow a customer to indicate an interest in a product by typing a command, clicking a button or other graphical interface element, or otherwise interacting with said client. If a customer expresses an interest in a featured product, a client may allow a customer to create a one-time order, or to configure recurring orders.

In addition to allowing customers to record product usage and order new inventory or new products, client software may also display advertisements on a rotating basis, and may be used for other purposes. A typical client software screen may also contain additional information and fields, including, but not limited to, a Product SKU field, a User-ID field, a Doctor-ID field, and a Sales Consultant Contact field.

When customers are not directly interacting with client software, client software may place a cursor in a Product SKU field by default. Placing a cursor in a Product SKU field can allow client software to ready accept an automatically or manually entered product identifier, such as a barcode label scanned via a wedge-style bar-code scanner.

As product identifiers are entered, client software may request a User-ID for each product identifier or set of product identifiers. A User-ID is a unique identifier created for each employee or set of employees within an organization. Such identifiers may be entered manually through an active user interface, such as, but not limited to, a keyboard, touch screen, or number pad, or through a passive user interface, such as, but not limited to, biometric recognition equipment, barcode identifiers worn by or associated with an employee, or through RFID tags worn by or associated with an employee. User-ID's may be combined with passwords to create a more secure inventory tracking system.

User-ID's may be used to track persons removing items from an inventory, but additional tracking or other controls may also be desirable. For example additional authorization may be required when employees remove expensive items or pharmaceutical items from an inventory. The present invention may recognize when such an inventory item is removed, and client software may request an additional identifier as authorization. Client software may even allow any user to enter a simple authorization for some inventory items, while for other inventory items a specialized authorization and/or related password may be required. A biometric or other positive identifier may be used in some applications.

When appropriate inventory tracking data has been entered into client software, the present invention may transmit such data to a server. A server may send a confirmation message to a client upon receipt of such data. If a confirmation message is not received within a predetermined period of time, the present invention may resend inventory tracking data. If successive resend attempts are unsuccessful, the present invention may follow a process similar to that illustrated by FIG. 3. Client software may allow additional inventory scans to occur while waiting for confirmation from a server.

In addition to recording inventory tracking information, client software may also allow a customer to access various options. Such options may include, but are not limited to, an administrative page, an inventory status inquiry page, and an inventory receipt page. An administrative page can allow authorized customers to create, edit, or remove User-ID's, special authorizations, groups of such accounts, and account-specific information. An inventory status inquiry page can retrieve and display a page containing customer inventory records, order status, and other such information.

An inventory status inquiry may be initiated through client software, which can send a page containing customer-specific information, as well as site-specific identification information stored on a client machine. In a preferred embodiment, a server receiving such a request may select records with appropriate site- and user-specific information from a table of customer inventory records. A server may generate a page or screen containing customer inventory information, including information from several tables. Table 1 below provides an example of columns displayed on a typical inventory request screen, as well as sample table and field names from which such data can be drawn.

TABLE 1

| Column Heading | Source Table | Source Field |
| --- | --- | --- |
| Description | PRODUCTS | DESCRIPTION |
| Product | CUSTOMER_INVENTORY | PRODUCT |
| Quantity In Stock | CUSTOMER_INVENTORY | ON_HAND_QTY |
| Order Point | CUSTOMER_INVENTORY | ROP |
| ReOrder Quantity | CUSTOMER_INVENTORY | ROQ |
| Activity Status | CUSTOMER_INVENTORY | STATUS |

An advantage of the present invention over the prior art is the ability to simplify adding new items or restocking items into an inventory. Linked Suppliers shipping goods to a customer can provide a specially coded packing list, and a customer can automatically or manually enter such a code into client software. Client software can validate a packing list number as belonging to a customer and ensure a packing list is not credited to a customer system more than once. Entry of an invalid or previously validated packing slip can cause client software to display an error message.

If a valid packing slip is entered, client software may retrieve shipment contents from a centralized database or from a supplier database, and automatically update customer inventory information to reflect inventory received. Client software may then display a message confirming successful inventory changes, and return a customer to a main page.

A product search page may also be accessible through client software. A product search page can allow a user to select a search type and, if appropriate, search parameters and search parameter values (collectively "search criteria"). By way of example, without intending to limit the present invention, a product search page may allow a customer to search by specific manufacturer and products of a certain classification.

When a customer has selected appropriate search criteria, client software may pass such search criteria to a server. A server may query a database of products and product descriptions and return products matching or approximating customer search criteria.

If a user has selected a descriptive search, a server may select records from a Products table, or other similar table, whose data matches or approximates descriptive text entered by a user. If a user has selected a parameter search, a server may select Product table records whose fields match or approximate user search requests. To expedite such selections, a server may index descriptions, manufacturers, product classes, product names, and other frequently searched fields.

When appropriate records are selected, a server may transmit such records to client software for display. Client software may present such records in a variety of formats, including, but not limited to, a columnar or tabular format. Table 2 lists sample column names, sample source table names, source field names, and additional functionality client software may present when displaying such records.

TABLE 2

| Column Heading | Source Table | Source Field |
| --- | --- | --- |
| Desription | PRODUCTS | SHORT_DESCRIPTION |
| Product ID | PRODUCTS | PRODUCT_ID |
| Manufacturer | PRODUCTS | MANUFACTURER |
| Mfg Item No. | PRODUCTS | MANUFACTURER_ITEM_NUMBER |
| Prod. Type | PRODUCTS | PRODUCT_TYPE |
| Prod. Class | PRODUCTIONS | PRODUCT_CLASS |
| Check Availability | None | Window action field |
| Add to Stock Plan | None | Window action field |

As Table 2 indicates, client software can allow a customer to check product availability and add products to a stock plan. In a preferred embodiment, client software may make such functionality available for each record displayed. In an alternative embodiment, records may have check boxes or other selection controls, thereby allowing customers to check the availability of multiple items, and add multiple items to a stock plan.

When a customer checks availability of a product or products, the present invention may search Linked Supplier inventories to determine quantities available, physical location, anticipated delivery times, and the like. When inventory is available, client software may allow a customer to order a product.

When a customer chooses to add a product to an inventory or stocking plan, client software may request restocking and other parameters from a customer, then send appropriate information to a server. A server may add an appropriate entry to a Customer_Inventory or other similar table, thereby enabling inventory tracking through the present invention.

Client software can also allow a customer to request a telephone call, an E-mail, or other contact from a sales consultant. In a preferred embodiment, a customer may select a product or supplier, and client software can query a server to determine an appropriate sales consultant for the selected product or supplier. A user can then be presented with a dialog box or other interactive interface which asks a customer to confirm a contact request. Once a contact request has been confirmed, client software may cause a server to store a request message in a Contact_Log table or other similar table.

In a preferred embodiment, a server may periodically scan Contact Log_table entries. When new or unanswered requests are found, a server may send a notification to a supplier alerting said supplier of such a request, where such a notification can include a customer E-mail address, telephone number, fax number, or other contact information, as well as other relevant customer and product information.

While the present invention can monitor inventory use and automatically order new inventory when necessary, a customer may anticipate a need for additional inventory based on parameters outside the scope of the present invention. By way of example, without intending to limit the present invention, if the present invention is used in a restaurant, and the Olympics was held in or near the city in which the restaurant is located, the restaurateur may foresee the need to order additional quantities of frequently used livestock inventory items. Client software can provide a customer with the ability to quickly place such orders.

Customers can initiate such an order by clicking a button or otherwise interacting with a graphical or physical interface. In a preferred embodiment, a customer may select from products or groups of products already included in an inventory or stocking plan, or a customer may search for products through an interface similar to that described earlier. As previously described, customers can designate standard restocking quantities, and client software may use such quantities as defaults when clients are requesting additional inventory. Client software may also present quantities on hand to help customers make smarter purchasing decisions. Based on such information, customers can modify order quantities before submitting an order.

Client software can transmit customer orders to a server. Upon receipt of a customer order, a server can initiate an order fulfillment process.

A server may also automatically place an order based on customer demand. A server may periodically scan a customer inventory table and monitor inventory usage. As inventory is depleted, a server can predict frequently used items, and order appropriate quantities. Initially, a server may order limited quantities, to limit customer costs. A server may increase order quantities for frequently ordered products as customer usage habits dictate. A server may also construct an historical usage characterization, so that seasonal or other periodic usage patterns can be automatically taken into account.

As orders are placed, a server can query Linked Supplier inventories to determine each supplier's ability to fulfill an order. A server can calculate shipping costs as each order is processed, and a server can select one or more suppliers who can most cost effectively meet customer needs. As qualified suppliers are identified, orders are placed which can include expedited delivery and other options as specified by a customer or as determined by a server.

A server can also post supplier invoices to an accounts payable system, generate customer invoices based on supplier invoices, post customer invoices to an accounts receivable system. A server may further integrate with an automated payment system, thereby limiting invoicing and other such expenses.

In addition to customer and order related functions, a server can also provide administrative functions. By way of example, without intending to limit the present invention, a user who is not a customer can register to be a customer through a server-provided interface. Such an interface may allow a user to specify a business name, business type, executive director or general manager, physical address, mailing address, shipping address, one or more telephone numbers, employee names, employee licensing and accreditation information, and the like.

As users submit such information, a server may validate that an address, telephone number, and zip code are all valid with respect to each other, and that all necessary fields have been filled. If any validations fail, a server may present a data entry page along with any invalid data, thus simplifying data correction.

A server and client software may also allow customers and suppliers to change various information. By way of example, without intending to limit the present invention, suppliers can change pricing; add or remove vendors and products; add, edit, or remove contacts; view account status and open invoices; and perform other such functions. Customers can adjust inventory counts to reflect audit results; add, edit, or remove employees and employee information; update payment and contact information; view account balances and make payments; and perform other such functions.

Linked Suppliers can also take advantage of many of these same features. Linked Suppliers implementing the present invention can track inventory; provide real-time inventory information to prospective customers; accept electronic orders; generate pick/pack lists; track order fulfillment process, including tracking into which containers each item in an order has been placed; generate bar-coded packing lists and shipping labels for each container; and generate invoices.

The present invention also provides Linked Suppliers with other advantages over the prior art. By way of example, without intending to limit the present invention, Linked Supplier inventory needs can be forecast based on prior order history, prior lead times, safety stock quantities, and the like, thereby reducing overall inventory investment. The present invention can also allow enable a Linked Supplier to track processing and shipping status for various products within an order, thereby providing a higher level of customer service. The present invention may also allow managers or other authorized individuals to electronically sign a purchase order, invoice, or other billing or order document and electronically transmit such a document to an appropriate recipient.

EXAMPLE 3

In one embodiment, an exemplary inventory management system comprises: one or more computers; one or more databases residing on said computers, in which inventory and customer information is stored; client software providing an interface to said database and performing administrative functions; a user identification subsystem; a subsystem through which new products can be added to said inventory database, and which enables proper accounting of restocked products within said inventory database; and a subsystem which accounts for a product or products within said database as such products are removed from inventory.

The inventory management system of Example 3, in which one or more of said subsystems are comprised of an optical reader which can read specially coded information on an object or person.

The inventory management system of Example 3, in which one or more of said subsystems are comprised of an electronic device for scanning wirelessly accessible identifiers associated with objects or persons.

The inventory management system of Example 3, in which said user identification subsystem is comprised of a biometric identification device.

The inventory management system of Example 3, in which said client software permits registration and removal of individual users, and modification of user information.

The inventory management system of Example 3, in which said client software allows users to be classified into groups, and where permissions or roles are assigned to such groups.

The inventory management system of Example 3, in which said client software allows products to be grouped into classifications, allows restrictions to be placed on distribution of such products, permits recording of patient information when individual products or products belonging to a particular group or set of groups are dispensed, and allows printing of product specific or group specific labels or information to be included with each product removed from inventory.

The inventory management system of Example 3, in which said client software monitors inventory levels and reports anticipated shortages.

The inventory management system of Example 3, in which said client software monitors inventory levels and generates orders to cover anticipated shortages.

The inventory management system of Example 3, in which said client software allows users to order new products or to supplement inventory when desired.

The inventory management system of Example 3, in which said client software allows users to specify a price for goods for sale within an inventory.

EXAMPLE 4

In another embodiment, an exemplary vendor managed inventory management system comprises: one or more suppliers maintaining inventory utilizing an inventory management system; one or more customers maintaining inventory utilizing an inventory management system; a central server, which facilitates communications and inventory management between said customers and said suppliers; and, a redundant data connection between said suppliers, said customers, and said central server.

The vendor managed inventory management system of Example 4, in which said central server receives inventory information from customers and suppliers, anticipates inventory shortages, generates orders to cover such shortages, selects suppliers and products for such orders, places orders with selected suppliers, and monitors order status.

EXAMPLE 5

In an alternate embodiment, an exemplary inventory distribution system comprises: a vending machine; a computer connected to said vending machine; software running on said computer; a printer; a user identification subsystem; and a data entry subsystem.

The inventory distribution system of Example 5, in which said user identification subsystem is comprised of a biometric scanner, RFID reader, barcode scanner, keyboard, touch sensitive display, or combinations thereof, and through which users can positively identify themselves to said computer via said software.

The inventory distribution system of Example 5, in which said data entry subsystem is comprised of an active or passive user interface, and through which users can request dispensation of certain products.

The inventory distribution system of Example 5, in which said printer prints product information when requested and as necessary to satisfy applicable regulations.

The inventory distribution system of Example 5, further comprising a central server and a redundant data connection between said vending machine and said server.

The inventory distribution system as described above, in which said computer monitors distribution of products contained within said vending machine, transmits such distributions to said server via said redundant data connection, and through which said server can notify a vending machine service provider of any inventory shortages.

EXAMPLE 6

In another embodiment, an exemplary automated method of inventory management comprises the steps of: accounting for received products in an inventory; monitoring products as such products are removed from an inventory; calculating trends based on the frequency with which products are used; determining optimal product quantities for each order, such that shipping costs are reduced and price points for different quantities are taken into account while also reducing expenditures. ordering additional stock as needed; tracking said orders; calculating order fulfillment trends based on delivery times from each supplier and for each product; and, determining preferred suppliers based on such order fulfillment trends.

The automated inventory management method of Example 6, in which the step of accounting for received products in an inventory involves electronically reading documentation supplied with each package and automatically updating inventory information to reflect package contents.

The automated inventory management method of Example 6, in which the step of monitoring products as such products are removed from an inventory involves electronically reading a product identifier associated with a product or group of products.

The automated inventory management method of Example 6, further including the step of identifying a user removing products from an inventory by electronically retrieving an identifier from said user.

EXAMPLE 7

In yet another embodiment, an exemplary automated order fulfillment method comprises the steps of: receiving an availability and pricing request from a customer for one or more products; determining acceptable alternatives for said products based on customer preferences; determining quantities available, pricing, quantities necessary for a price break, and anticipated delivery times from one or more suppliers to meet said request, including any acceptable alternatives; selecting products, product quantities, and suppliers that provide the most value while still meeting customer inventory needs; generating product pick and pack slips for each supplier; recording products as they are "picked" from a supplier inventory; recording products as they are packed into shipping packages; generating package packing slips and shipping labels; correlating shipping and packing information; shipping said packages; and tracking said shipments.

The automated order fulfillment method of Example 7, in which picked products are recorded by electronically scanning identifiers associated with such products.

The automated order fulfillment method as described above, in which picked products are recorded by electronically scanning identifiers associated with such products using a handheld computing device, to which a barcode scanner is attached.

The automated order fulfillment method of Example 7, in which the step of recording products as they are packed further includes the step of scanning an identifier associated with a shipping package prior to scanning individual items packed into a shipping package.

The automated order fulfillment method of Example 7, in which the packing and shipping labels include a machine readable identifier.

EXAMPLE 8

An exemplary vendor managed inventory and group purchasing system, comprises: one or more servers; one or more databases running on said servers; client software running on one or more computers at a customer site, which is capable of monitoring customer inventories and reporting such information to said server via a redundant data communications connection; client software running on one or more computers at a supplier site, which is capable of monitoring product quantities on hand and supports multiple product prices depending on order quantities, and which is capable of transmitting such information to said server via a redundant data communications connection; and software running on said server that consolidates customer orders such that customer costs may be decreased by leveraging the consolidated order quantities.

It should be obvious to one skilled in the art that the present invention allows inventory tracking and management through a combination of manual, semi-automated, and automated means. The present invention also allows a manager to purchase in bulk and take advantage of promotions and other special offerings, thus reducing inventory costs. In addition, the present invention reduces the amount of inventory which must be kept on-hand by accurately modeling and predicting inventory needs. The present invention further provides customers with the ability to review new equipment, communicate with each other, and buy and sell excess inventory, refurbished equipment, and the like.

While various alternative embodiments of the present invention have been disclosed and described in detail herein, it will be apparent to those skilled in the art that various changes in form and detail may be made therein without departing from the spirit and scope thereof, including applying the present invention to fields other than livestock inventory management and tracking.

I claim:

1. A livestock inventory management system, comprising the following elements, operably connected:
   (a) at least one computer having at least one storage medium;
   (b) one or more databases residing on said at least one storage medium;
   (c) data collection software stored in a non-transitory storage medium providing an interface to said one or more database(s);
   (d) one or more unique readable identifiers accompanying a livestock animal;
   (e) one or more data collection locations in communication with said at least one computer, each having:
      (i) a reader appropriate to at least one unique identifier accompanying a livestock animal and capable of reading said at least one unique identifier, and
      (ii) a data measurement device; and
   (f) a timing device,
   wherein said software executes the following actions:
      (i) storing in said one or more databases at least one data item measured by a data measurement device and associated with the unique readable identifier for a livestock animal, captured at a first time,
      (ii) storing in said one or more databases at least one data item measured by a data measurement device and associated with the unique readable identifier for said livestock animal, captured at a second time,
      (iii) generating and outputting a report of said at least two data items,
      (iv) tracking a livestock inventory item and updating at least one database for (1) a customer and (2) a livestock merchant, as livestock inventory items are added to, restocked to, or removed from inventory,
      (v) evaluating customer inventory information and inventory or cost information for a plurality of livestock merchants of said livestock animal in light of restocking parameters provided by said customer, and
      (vi) automatically ordering livestock merchant inventory which best fulfills said inventory restocking parameters provided by said customer.

2. The livestock inventory management system of claim 1, wherein said at least one unique identifier accompanying a livestock animal is selected from the group consisting of a barcode, an RFID tag, and a biometric feature.

3. The livestock inventory management system of claim 1, wherein said at least one unique identifier is an RFID tag.

4. The livestock inventory management system of claim 1, wherein said data measurement device is selected from the group consisting of devices which measure location, temperature, humidity, oxygen content, and other environmental conditions.

5. The livestock inventory management system of claim 1, wherein said first time is at the time of birth of said livestock animal.

6. The livestock inventory management system of claim 1, wherein said second time is at the time of sale to a consumer.

7. The livestock inventory management system of claim 1, wherein said software stores in said one or more databases one or more additional data items measured by at least one data measurement device and associated with the unique readable identifier for a livestock animal, captured at third and succeeding times intervening said first and second times.

8. The livestock inventory management system of claim 7, wherein said one or more additional data items are associated with a livestock merchant.

9. The livestock inventory management system of claim 1, wherein said report is output in response to a query.

10. The livestock inventory management system of claim 1, wherein said report is output automatically.

11. The livestock inventory management system of claim 1, wherein said data collection location is in communication with said at least one computer via the internet.

12. The livestock inventory management system of claim 1, wherein said software additionally forecasts the inventory needs of said customer and livestock merchant based on inventory usage, or inventory availability trends, or both,
   wherein said evaluation of customer inventory information and livestock merchant inventory and cost information is executed in light of said restocking parameters provided by said customer and said forecast inventory needs.

13. The livestock inventory management system of claim 1, wherein said software monitors inventory levels and reports anticipated shortages.

14. The livestock inventory management system of claim 1, wherein said software monitors inventory levels and generates orders to cover anticipated shortages.

15. The livestock inventory management system of claim 1, wherein said software allows users to order new inventory items or to supplement inventory when desired.

16. The livestock inventory management system of claim 1, wherein said customer inventory information is collected and stored for multiple customer business sites or for multiple customers, and wherein inventory restocking parameters provided by said customer are collected and stored for each said customer.

17. The livestock inventory management system of claim 1, wherein said inventory and cost information is collected and stored for multiple livestock merchants.

18. The livestock inventory management system of claim 1, wherein said step of updating takes place in real time.

19. The livestock inventory management system of claim 3, wherein said detecting of an RFID tag associated with each said inventory item is executed by one or more RFID readers.

20. The livestock inventory management system of claim 3, wherein said RFID tag is read by a hand held electronic device.

21. The livestock inventory management system of claim 3, wherein said RFID tag is read by an electronic portal device.

22. The livestock inventory management system of claim 1, wherein said software allows inventory items to be grouped, allows restrictions to be placed on distribution of such inventory items, provides for recording of information when an inventory item belonging to a group is dispensed, and allows printing of inventory item specific information for inclusion with each inventory item removed from inventory.

23. The livestock inventory management system of claim 1, wherein said software allows users to specify a price for goods for sale within an inventory.

24. The livestock inventory management system of claim 1, wherein a user of the computer program is identified via an optical reader which can read specially coded information on a person.

25. The livestock inventory management system of claim 1, wherein a user of the computer program is identified via an electronic device for scanning wirelessly accessible identifiers associated with a person.

26. The livestock inventory management system of claim 1, wherein a user of the computer program is identified via a biometric identification device.

27. A computer implemented method for livestock inventory management, comprising the steps of:
 (a) at one or more data collection locations having a reader appropriate to at least one unique identifier accompanying a livestock animal and a data measurement device, measuring, collecting, and storing, in one or more databases on one or more storage media, maintained on one or more computers, at least the following data:
  (i) at least one data item measured by a data measurement device and associated with a unique readable identifier for a livestock animal, captured at a first time, and
  (ii) at least one data item measured by a data measurement device and associated with a unique readable identifier for said livestock animal, captured at a second time;
 (b) generating and outputting a report of said at least two data items;
 (c) tracking a livestock inventory item and updating at least one database for (1) a customer and (2) a livestock merchant, as livestock inventory items are added to, restocked to, or removed from inventory;
 (d) evaluating customer inventory information provided by said customer and inventory or cost information for a plurality of livestock merchants of said livestock animal in light of restocking parameters provided by said customer;
 (e) automatically ordering livestock merchant inventory which best fulfills said inventory restocking parameters provided by said customer; and
 (f) providing access via software to information in said one or more databases to each said customer and livestock merchant,
  wherein said software allows one or more customers and livestock merchants to be classified into groups, and where permissions or roles are assigned to such groups.

28. The method of claim 27, wherein said at least one unique identifier accompanying a livestock animal is selected from the group consisting of a barcode, an RFID tag, and a biometric feature.

29. The method of claim 28, wherein said at least one unique identifier is an RFID tag.

30. The method of claim 27, wherein said measured data is selected from the group consisting location, temperature, humidity, oxygen content, and other environmental conditions.

31. The method of claim 27, wherein said first time is at the time of birth of said livestock animal.

32. The method of claim 27, wherein said second time is at the time of sale to a consumer.

33. The method of claim 27, comprising collecting and storing in said one or more databases one or more additional data items measured by at least one data measurement device and associated with the unique readable identifier for a livestock animal, captured at third and succeeding times intervening said first and second times.

34. The method of claim 33, wherein said one or more additional data items are associated with a livestock merchant.

35. The method of claim 27, wherein said report is output in response to a query.

36. The method of claim 27, wherein said report is output automatically.

37. The method of claim 27, wherein said data collection location is in communication with said at least one computer via the internet.

38. The method of claim 27, comprising the additional step of forecasting the inventory needs of customers and livestock merchants based on inventory usage or inventory availability trends,
 wherein said step of evaluating said customer inventory information and said livestock merchant inventory and cost information is executed in light of restocking parameters provided by said customer and forecast inventory needs.

39. The method of claim 27, wherein said step of ordering is completed automatically based upon the evaluation of said customer inventory information and said livestock merchant inventory and cost information, in light of restocking parameters provided by said customer.

40. The method of claim 27, wherein said method comprises the additional step of forecasting inventory usage or inventory availability for each said customer and livestock merchant based upon customer and livestock merchant information.

41. The method of claim 27, wherein said method comprises the additional steps of monitoring inventory levels and reporting anticipated shortages.

42. The method of claim 27, wherein said method comprises the additional steps of monitoring inventory levels and generating orders to cover anticipated shortages.

43. The method of claim 27, wherein said method comprises the additional step of providing for users to order inventory items or to supplement inventory when desired.

44. The method of claim 27, wherein said customer inventory information is collected and stored for multiple customer business sites or for multiple customers, and wherein inventory restocking parameters provided by said customer are collected and stored for each said customer.

45. The method of claim 27, wherein said inventory and cost information is collected and stored for multiple livestock merchants.

46. The method of claim 27, wherein said step of updating takes place in real time.

47. The method of claim 27, wherein said step of reading said RFID tag is by a hand held electronic device.

48. The method of claim 27, wherein said step of reading said RFID tag is by an electronic portal device.

49. The method of claim 27, comprising the additional step of identifying specially coded information on an object or a person via an optical reader.

50. The method of claim 27, comprising the additional step of identifying a wirelessly accessible identifier associated with an object or a person via an electronic device for scanning wirelessly accessible identifiers.

51. The method of claim 27, comprising the additional step of identifying a user via a biometric identification device.

52. A computer program product for managing customer inventory, comprising program instructions stored on at least one computer readable storage medium which when executed cause a computer to:
   (a) collect and store, on one or more databases, at least the following data:
      (i) at least one data item measured by a data measurement device and associated with a unique readable identifier for a livestock animal, captured at a first time, and
      (ii) at least one data item measured by a data measurement device and associated with a unique readable identifier for said livestock animal, captured at a second time;
   (b) generate and output a report of said at least two data items;
   (c) evaluate customer inventory information provided by a customer and inventory or cost information for a plurality of livestock merchants in light of restocking parameters provided by said customer;
   (d) order livestock merchant inventory which best fulfills said inventory restocking parameters provided by each said customer;
   (e) track inventory items for (1) each customer and (2) each livestock merchant, as inventory items are added to, restocked to, or removed from inventory,
   (f) update said data on said one or more databases; and
   (g) provide access to the information in said one or more databases to said customer and livestock merchant,
   wherein said computer program product allows customers and livestock merchants to be classified into groups, and where permissions or roles are assigned to such groups.

53. The computer program product of claim 52, wherein said at least one unique identifier accompanying a livestock animal is selected from the group consisting of a barcode, an RFID tag, and a biometric feature.

54. The computer program product of claim 53, wherein said at least one unique identifier is an RFID tag.

55. The computer program product of claim 52, wherein said measured data is selected from the group consisting location, temperature, humidity, oxygen content, and other environmental conditions.

56. The computer program product of claim 52, wherein said first time is at the time of birth of said livestock animal.

57. The computer program product of claim 52, wherein said second time is at the time of sale to a consumer.

58. The computer program product of claim 52, comprising collecting and storing in said one or more databases one or more additional data items measured by at least one data measurement device and associated with the unique readable identifier for a livestock animal, captured at third and succeeding times intervening said first and second times.

59. The computer program product of claim 58, wherein said one or more additional data items are associated with a livestock merchant.

60. The computer program product of claim 52, wherein said report is output in response to a query.

61. The computer program product of claim 52, wherein said report is output automatically.

62. The computer program product of claim 52, wherein said data collection location is in communication with said at least one computer via the internet.

63. The computer program product of claim 52, further comprising program instructions for allowing the forecasting of inventory needs of said customer and livestock merchant based on inventory usage or inventory availability trends,
   wherein said evaluation of customer inventory information and livestock merchant inventory and cost information is executed in light of said restocking parameters provided by said customer and said forecast inventory needs.

64. The computer program product of claim 52, further comprising program instructions for:
   (1) monitoring inventory levels; and
   (2) reporting anticipated shortages.

65. The computer program product of claim 52, further comprising program instructions for:
   (1) monitoring inventory levels; and
   (2) generating orders to cover anticipated shortages.

66. The computer program product of claim 52, further comprising program instructions for allowing users to order inventory items or to supplement inventory when desired.

67. The computer program product of claim 52, further comprising program instructions wherein said step of ordering is completed automatically based upon the evaluation of said customer inventory information and said livestock merchant inventory and cost information in light of said restocking parameters provided by said customer.

68. The computer program product of claim 52, further comprising program instructions for allowing said step of updating to take place in real time.

69. The computer program product of claim 52, further comprising program instructions for providing access to the information in said one or more databases, according to said assigned roles or permissions, to a user of the computer program identified via an optical reader which can read specially coded information on a person.

70. The computer program product of claim 52, further comprising program instructions for providing access to the information in said one or more databases, according to said assigned roles or permissions, to a user of the computer program identified via an electronic device for scanning wirelessly accessible identifiers associated with a person.

71. The computer program product of claim 52, further comprising program instructions for providing access to the information in said one or more databases, according to said assigned roles or permissions, to a user of the computer program identified via a biometric identification device.

72. The computer program product of claim 52, further comprising program instructions for enabling registration and removal of individual users of the computer program product and modification of user information.

73. The computer program product of claim 52, further comprising program instructions for performing administrative functions.

74. The computer program product of claim 52, further comprising program instructions for:
(1) allowing inventory items to be grouped into classifications;
(2) allowing restrictions to be placed on distribution of such inventory items;
(3) providing for recording of information when individual inventory items or inventory items belonging to a particular group or set of groups are added to, restocked to, or removed from inventory; and
(4) allowing printing of inventory item specific or group specific labels or information to be included with each inventory item removed from inventory.

75. The computer program product of claim 52, further comprising program instructions for allowing users to specify a price for goods for sale within an inventory.

76. The computer program product of claim 52, further comprising program instructions for allowing detection of an RFID tag associated with each said inventory item to be executed by one or more RFID readers.

77. The computer program product of claim 52, further comprising program instructions for allowing said RFID tag to be read by a hand held electronic device.

78. The computer program product of claim 52, further comprising program instructions for allowing said RFID tag to be read by an electronic portal device.

* * * * *